May 29, 1962 C. J. BARBAGALLO ET AL 3,037,193

ELECTRICAL APPARATUS FOR PROCESSING DIGITAL DATA

Filed Feb. 28, 1958 14 Sheets-Sheet 1

INVENTORS
CHARLES J. BARBAGALLO
EDWARD S. FABISZEWSKI
LOUIS G. OLIARI
BY Henry L. Hanson
ATTORNEY INVENTORS
CHARLES J. BARBAGALLO
EDWARD S. FABISZEWSKI
LOUIS G. OLIARI
BY Henry L. Hanson
ATTORNEY

ELECTRICAL APPARATUS FOR PROCESSING DIGITAL DATA

Filed Feb. 28, 1958

INVENTORS
CHARLES J. BARBAGALLO
EDWARD S. FABISZEWSKI
LOUIS G. OLIARI
BY Henry L. Hanson
ATTORNEY INVENTORS
CHARLES J. BARBAGALLO
EDWARD S. FABISZEWSKI
LOUIS G. OLIARI
BY Henry L. Hanson
ATTORNEY INVENTORS
CHARLES J. BARBAGALLO
EDWARD S. FABISZEWSKI
LOUIS G. OLIARI
BY Henry L. Hanson
ATTORNEY May 29, 1962 C. J. BARBAGALLO ET AL 3,037,193

ELECTRICAL APPARATUS FOR PROCESSING DIGITAL DATA

Filed Feb. 28, 1958 14 Sheets-Sheet 6

INVENTORS
CHARLES J. BARBAGALLO
EDWARD S. FABISZEWSKI
LOUIS G. OLIARI
BY Henry L. Hanson
ATTORNEY May 29, 1962 C. J. BARBAGALLO ET AL 3,037,193

ELECTRICAL APPARATUS FOR PROCESSING DIGITAL DATA

Filed Feb. 28, 1958 14 Sheets-Sheet 7

INVENTORS
CHARLES J. BARBAGALLO
EDWARD S. FABISZEWSKI
LOUIS G. OLIARI
BY Henry L. Hanson
ATTORNEY INVENTORS
CHARLES J. BARBAGALLO
EDWARD S. FABISZEWSKI
LOUIS G. OLIARI
BY Henry L. Hanson
ATTORNEY May 29, 1962 C. J. BARBAGALLO ET AL 3,037,193

ELECTRICAL APPARATUS FOR PROCESSING DIGITAL DATA

Filed Feb. 28, 1958 14 Sheets-Sheet 9

INVENTORS
CHARLES J. BARBAGALLO
EDWARD S. FABISZEWSKI
LOUIS G. OLIARI
BY Henry L. Hanson
ATTORNEY

ELECTRICAL APPARATUS FOR PROCESSING DIGITAL DATA

Filed Feb. 28, 1958 14 Sheets-Sheet 10

INVENTORS
CHARLES J. BARBAGALLO
EDWARD S. FABISZEWSKI
LOUIS G. OLIARI
BY Henry L. Hanson
ATTORNEY INVENTORS
CHARLES J. BARBAGALLO
EDWARD S. FABISZEWSKI
LOUIS G. OLIARI
BY Henry L. Hanson
ATTORNEY

ELECTRICAL APPARATUS FOR PROCESSING DIGITAL DATA

Filed Feb. 28, 1958

INVENTORS
CHARLES J. BARBAGALLO
EDWARD S. FABISZEWSKI
LOUIS G. OLIARI
BY Henry L. Hanson
ATTORNEY INVENTORS
CHARLES J. BARBAGALLO
EDWARD S. FABISZEWSKI
LOUIS G. OLIARI
BY Henry L. Hanson
ATTORNEY May 29, 1962 C. J. BARBAGALLO ET AL 3,037,193

ELECTRICAL APPARATUS FOR PROCESSING DIGITAL DATA

Filed Feb. 28, 1958 14 Sheets-Sheet 14

INVENTORS
CHARLES J. BARBAGALLO
EDWARD S. FABISZEWSKI
LOUIS G. OLIARI
BY Henry L. Hanson
ATTORNEY United States Patent Office 3,037,193

Patented May 29, 1962

3,037,193
ELECTRICAL APPARATUS FOR PROCESSING DIGITAL DATA

Charles J. Barbagallo, Needham, Edward S. Fabiszewski, Lexington, and Louis G. Oliari, Brockton, Mass., assignors to Minneapolis-Honeywell Regulator Company, Minneapolis, Minn., a corporation of Delaware Filed Feb. 28, 1958, Ser. No. 718,336
14 Claims. (Cl. 340—172.5)

A general object of the present invention is to provide a new and improved apparatus for manipulating digital data of the type associated with electronic data processing machines. More specifically, the present invention is concerned with digital data processing apparatus useful in converting information in one digital code into another.

The processing of digital data frequently requires that the data be scanned and the processing be controlled in accordance with whether or not the information is that which is desired. For example, when data is recorded on a record tape, it may be desired to convert the data from a binary coded decimal notation to the Hollerith form of notation in order for the information to be compatible with a utilization device, such as a data printer or a tabulating card punch. One form of apparatus with which the present invention is adapted to be used co-operates with a data storage tape which has the informational data stored on the tape in specific groups, sometimes referred to as blocks. It is possible in this form of apparatus to carry along with the information in each block certain control and identification information which may be used in various ways in the associated processing apparatus. Thus, if several types of information have been placed on a record tape, each type may be characteristically identified by a special code group. Further, the information within each type may be further identified by other code groups whereby portions of data may be selectively accepted or rejected, a block at a time, for use in the associated apparatus.

It is accordingly a more specific object of the present invention to provide a new and improved data processing apparatus incorporating means for selectively identifying information groups and associated circuitry for accepting or rejecting portions of each information group.

In one embodiment of the invention, the information on the associated data tape is in serial form on a plurality of channels which are positioned along the length of the tape. The associated apparatus is so arranged that selected ones of the channels may have the information therein read simultaneously into an associated storage register where the information is examined and the information then processed or not as desired. When processed, the information is moved serially from the register to a suitable decoding circuit. The flexibility of the register used in the present invention considerably enhances the data handling capabilities of the over-all circuit.

A further object of the invention is therefore to provide a new and improved apparatus for processing digital data comprising a register having facilities for simultaneously reading into the register from a plurality of serial data supply sources and then selectively transfering the information therefrom in serial form.

The present invention has incorporated magnetic core logical circuitry of a type to further accomplish the foregoing objects. The circuit control functions required in the present novel circuitry are readily realized and checked using this type of circuitry in combination with selected control information supplied to the apparatus.

A still further object of the invention is therefore to provide a new and improved data manipulating circuit including magnetic core devices as the active elements in the circuitry.

The various features of novelty which characterize the invention are pointed out with particularity in the claims annexed to and forming a part of the present specification. For a better understanding of the invention, its advantages, and specific objects attained with its use, reference should be had to the accompanying drawings and descriptive matter in which there are illustrated and described preferred embodiments of the invention.

Figure 1:
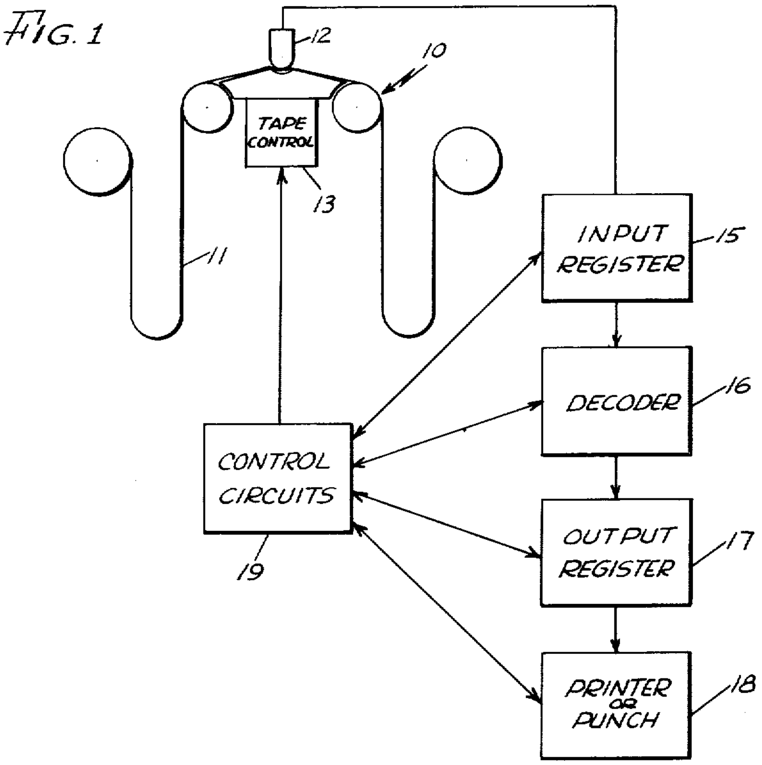
FIGURE 1 is a diagrammatic representation of the apparatus into which the novel features of the present invention have been incorporated.

Referring first to FIGURE 1, there is here illustrated a typical apparatus which is adapted to incorporate the features of novelty of the present invention. The numeral 10 identifies a tape transport mechanism which is adapted to process a record tape on which is stored digital data. This tape transport mechanism may well take the form of the mechanism illustrated in the co-pending application of Henry W. Schrimpf, entitled "Storage Apparatus," Serial Number 583,118, filed May 7, 1956. In this mechanism, there is a record tape 11 which is arranged to be transferred past a data transfer head 12.

The head 12 is adapted to extract the information from the tape and transmit it to a suitable utilization apparatus. The motion of the tape is directed by a tape control mechanism 13. As the tape 11 is moved past the transfer head 12, data is extracted therefrom and is applied to the utilization apparatus which is here described as being an apparatus for converting the information on tape into a code usable by an output mechanism.

The conversion apparatus of which the present invention is a part includes an input register 15, a decoder 16, an output register 17, and a printer or tabulating card punch 18. Checking and control circuits are illustrated by the block 19. The control circuits 19 are associated with each of the other major elements of the apparatus 15–18, as well as the tape control 13.

The apparatus of FIGURE 1 functions to take the digital data which is on the tape 11 in a first code and pass it through a suitable decoder so that the output of the decoder will be compatible with a printing mechanism 18. In one embodiment of the invention, the data on the tape 11 was binary coded information and this binary coded information was decoded or converted into the Hollerith type designation, the latter designation being compatible with a printer connected to the output thereof. The printer 18 may be of the type which is adapted to operate with the Hollerith code as used in well-known commercially available tabulating cards.

Figure 2:
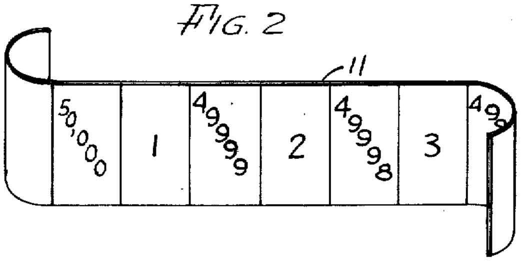
FIGURE 2 illustrates a section of the data storage tape which is adapted for use in the present invention.

FIGURE 2 illustrates a section of the tape 11 which is adapted for use in the mechanism of FIGURE 1. As discussed in the aforedescribed Schrimpf application, the record tape is divided into a series of blocks, every other one of which is arranged to be examined as the tape is moved in one direction past the data transfer head. Thus, for example, as the tape is first analyzed by the reading of blocks 1, 2, and 3. The blocks therebetween will appear as dead space or inactive spaces on the tape thereby providing the necessary space needed for the starting and stopping of the tape. This insures that the tape is at its desired speed when it is passed under the data transfer head for the particular active block to be read. The blocks are separated by suitable block marks on a channel on the tape, the marks being referred to as beginning and end block marks.

Figure 3:
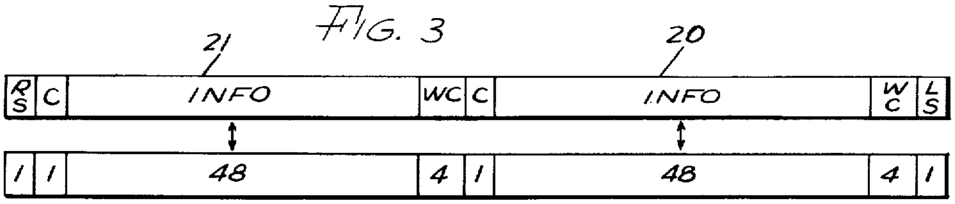
FIGURE 3 illustrates the manner in which the information is formed on the record tape.

The information within each of the blocks is divided into a series of machine words which are recorded in a series of channels extending along the length of the tape. In the embodiment of the invention described herein, the information on the tape took the form of two words written serially in each channel in the manner illustrated in FIGURE 3. Referring to FIGURE 3, there are two words illustrated in terms of information groups at 20 and 21. Each group of information compirses a total of forty-eight bits which may be binary coded decimal information with four bits per decimal number. Thus, twelve digits may be recorded in each word. When a six bit code is used for alpha-numeric data, eight characters will comprise a complete machine word. Associated with each forty-eight bits of information are four bits which are designated as the weight count for the information. This weight count acts as a satellite type of checking means which is carried with the information as it is transferred to insure that the transfer has been made without error. Further, the information in each of the words 20 and 21 carries therewith a complement bit C which is an indicator to tell whether or not the information recorded on the tape was recorded in the complement form or not.

The information in the two words is identified in each channel by a lead sentinel LS which is first detected as the tape is passsed under the data transfer head. After the transfer has been completed, a final bit, the rear sentinel RS, is detected and this takes the form of a further bit recorded on the tape.

Figure 4:
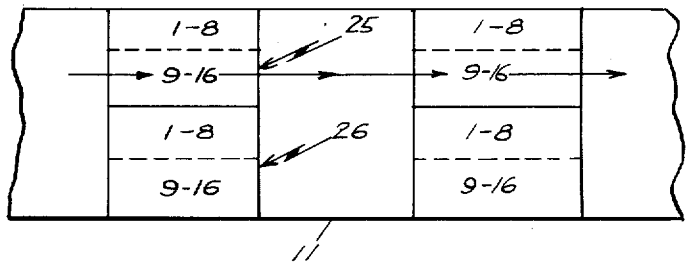
FIGURE 4 illustrates the arrangement of the information in individual blocks and blockettes on the information tape.

FIGURE 4 illustrates the manner in which the words are arranged on the tape at the time the tape is to be used in a converison operation for operating a printer or punch as illustrated in FIGURE 1. Each block is arranged to be divided into two blockettes 25 and 26, each blockette containing sixteen words. Since each blockette contains sixteen words, the number of channels for each blockette will be eight. As a matter of convenience, only four channels are read at a time. In other words, eight machine words would be read at any one time. In the presently described apparatus, when a beginning of run search is being made, only words 9–16 of the first blockette 25 will be read. This latter form of reading on the tape 11 as illustrated in FIGURE 4 is provided primarily to determine where a particular run of information is to be started. In other words, the tape 11 may be arranged with several different groups of information thereon and in the course of a particular data processing problem, only one of those groups, which may comprise several blocks, is to be further manipulated and printed out from the tape. As will be more fully described hereinafter, the beginning of run is identified by characteristic control data carired along with the information, preferably in the word 16 in the first blockette of each block. Once the beginning of run designation has been sensed, the control circuits of the apparatus will then be set to operate so that all of the information in the channels may be read from the tape into the conversion apparatus. In this regard, selected blocks of information within each group may also be examined to determine if the data is to be selectively processed or rejected.

Figure 5:
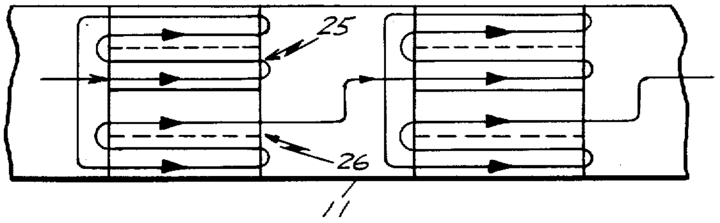
FIGURE 5 illustrates the manner in which the information is read when all channels on the tape have information stored therein.

FIGURE 5 illustrates the manner in which a normal reading operation will take place wherein all the channels of information on the tape in the two blockettes 25 and 26 are read. In the normal read, words 9–16 of blockette 25 will be read first. The tape is then reversed and the reading circuits conditioned so that when the next read signal is received, words 1–8 of the blockette 25 are read. The tape is then again reversed and words 9–16 of blockette 26 are read followed by the reading of words 1–8 of blockette 26. After blockette 26 has been read, the apparatus will move on to the next block of information and the tape will then again be read in the same manner as the blockettes 25 and 26 were read.

Figure 6:
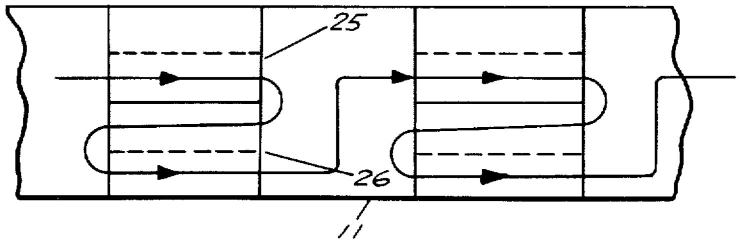
FIGURE 6 illustrates the manner in which the tape is scanned for selected control information.

FIGURE 6 illustrates the manner in which the information on the tape is scanned after a beginning of run point has been reached in order to determine if each blockette of the information is to be processed or is to rejected. In this instance, the tape 11 is arranged so that words 9–16 of blockette 25 are read first. The tape is then reversed and words 9–16 of blockette 26 are read next. If the desired control information is not detected in this reading of the two blockettes, the apparatus moves on to the next block where a similar scanning of words 9–16 in the two blockettes is made.

Figure 7:
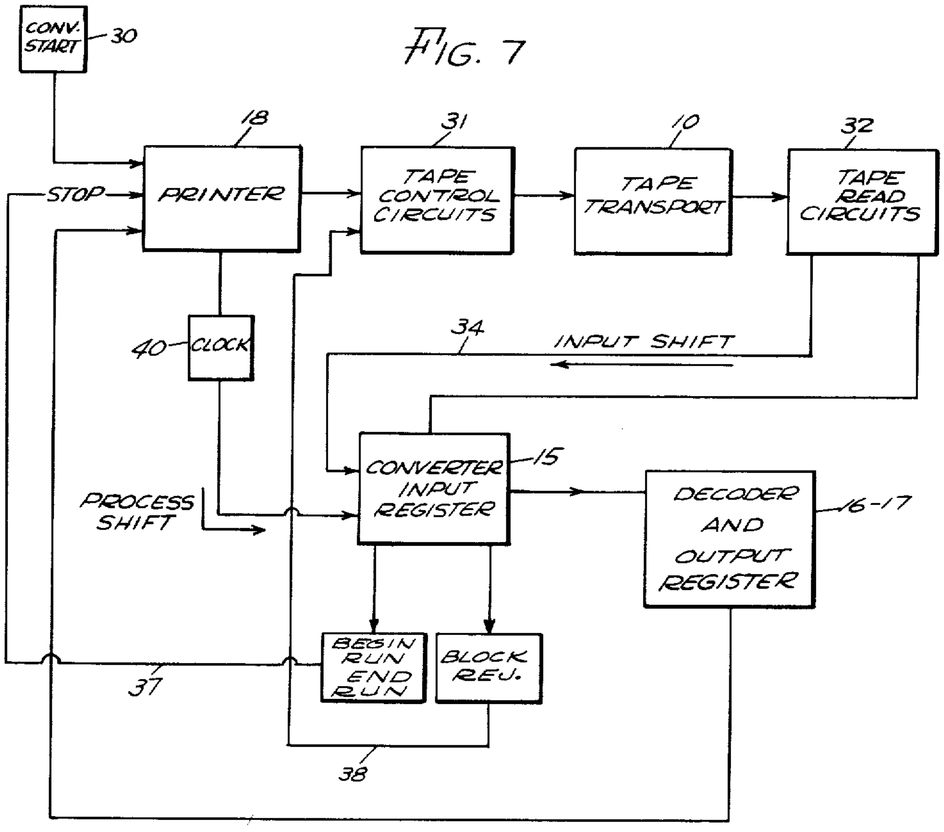
FIGURE 7 is a block diagram representation of a converter circuit which incorporates the present invention.

In order to better facilitate an understanding of the present invention, reference should be made to FIGURE 7 which illustrates diagrammatically the arrangement of the principal portions of the apparatus essential for the controlling of the movement of the tape and a transfer of information therefrom into the input register of the converter apparatus. A start signal is provided by a converter start switch 30 and the converter start signal is arranged to supply a signal to a printer 18 to initiate the timing cycle for the over-all apparatus. A signal from the printer 18 is fed into the tape control circuits 31 which in turn supplies appropriate control signals to the tape transport 10 so that information is read by the tape read circuits 32 and then applied to the converter input register 15. The tape read circuits 32, in addition to supplying information on output lead 33 also supply shift pulses on the lead 34 for shifting the information in the registers of the converter input register 15.

The converter input register has a pair of control outputs at 35 and 36. The output at 35 is used to supply a beginning of run or end of run signal when such is detected from data transferred into the register. When a beginning of run or end of run code is detected, a stop signal is sent out on the output lead 37 to the printer to stop the operation thereof, and also to reverse the tape so that the block having the beginning of run code therein may be read on the tape read operation.

The lead 36 goes to a block reject circuit which is adapted to selectively accept or reject selected blockettes transferred into the input register 15. When the block reject code is detected from the information in the input register, the block reject circuit will supply on output lead 38 a signal to the tape control circuit which will initiate a further tape read to transfer a new batch of information into the input register if there is no end of run signal. In addition, the block reject circuit is effective to clear the input register and to prevent the transfer of information out of the converter input register on the lead 39 to the decoder and output register 16—17.

In a normal run, and in the absence of a block reject, once the input register has received information, a signal will be applied from the printer 18 to the clock circuitry 40. This circuitry is used for supplying the process signals to shift information out of the converter input register 15 on the lead 39 to the decoder of the apparatus.

Figure 8:
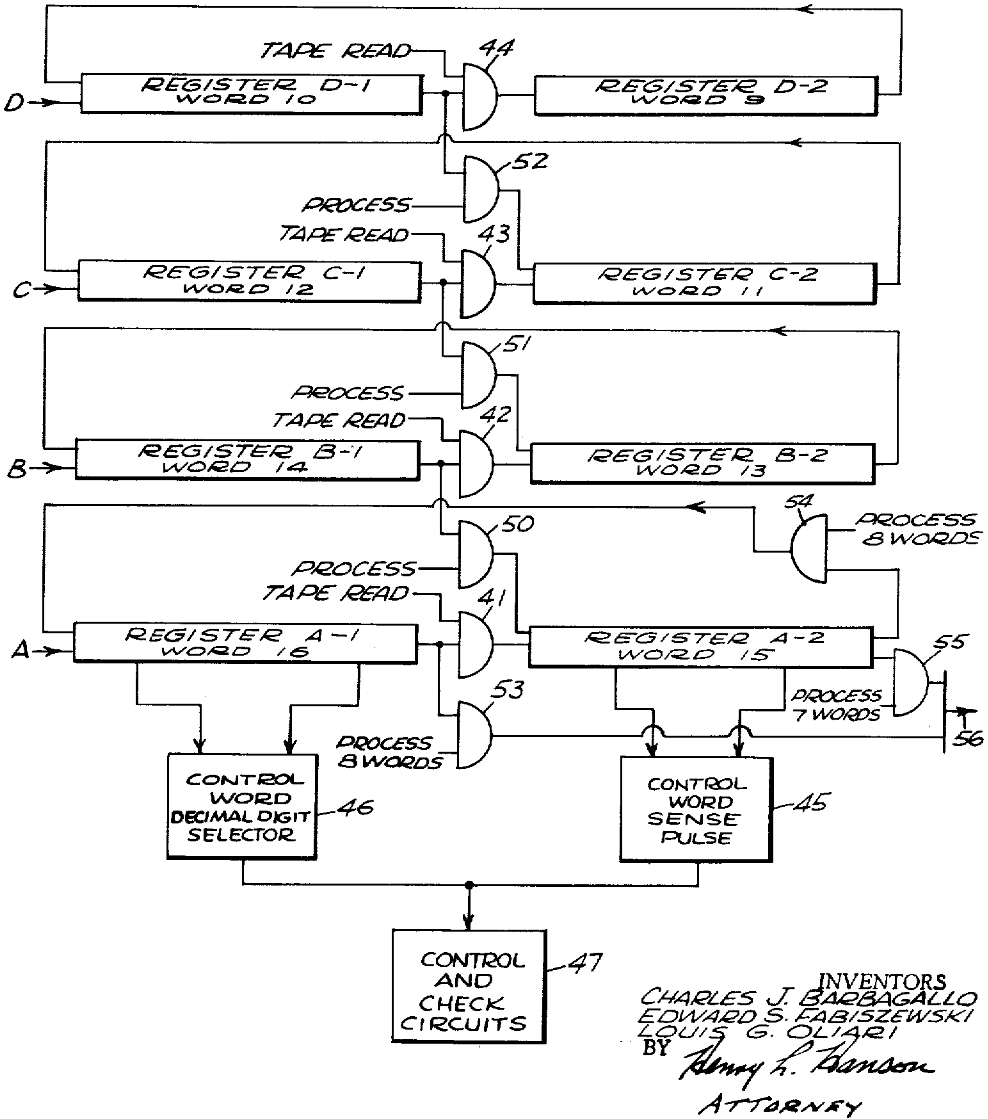
FIGURE 8 illustrates diagrammatically the arrangement of the input register circuits and the control circuits associated therewith.

FIGURE 8 illustrates a logical representation of the input register of the present apparatus. This input register comprises a plurality of serial registers which are adapted to be simultaneously filled from information derived from the tape. The control information is selectively examined in one of the registers and the processing or rejecting of the information is then carried out. More specifically, the input register has four input lines A, B, C and D. These input lines are arranged for connection to suitable data sources supplying information to each of the inputs serially in accordance with the information from four channels on the record tape. By definition in the described apparatus, on the first tape read in any blockette, words 9–16 are read with words 15 and 16 being read into the registers A–2 and A–1 respectively. Words 13 and 14 are read into the registers B–2 and B–1 respectively, words 11 and 12 are read into the registers C–2 and C–1 respectively, and the words 9 and 10 are read into the registers D–2 and D–1 respectively. During the read-in from tape, the data will come in serially from the inputs A, B, C and D into the asociated registers. The read-in will be through control circuits shown logically as gating circuits 41, 42, 43 and 44 with a tape read signal activating the gates.

As the information is read into the A input and registers A–1 and A–2, the lead sentinel for the two words 15 and 16 will be detected in register A–2 and applied through a control word sense circuit 45. Similarly, as word 16 is moving into the register A–1, the control word, which is word 16 in the present apparatus, will be examined for specific decimal digits and if a particular decimal digit combination is present, there will be an output from the detecting circuit 46 which will be applied along with the sense signal output to a control and check circuit 47, the latter to be more fully described hereinafter.

Once the information has been read into the input register, and the control circuits indicate that the information is to be processed, the tape read signals on the gates 41, 42, 43 and 44 will be inactive and these gates will be closed. The process signal will then become active and this will supply an input gate opening signal to each of the gates 50, 51 and 52. In addition, a process signal will be applied selectively to the gates 53, 54 and 55 depending upon whether or not seven of the words in the register are to be processed or eight words are to be processed. If all eight words, including word 16, are to be processed, then the gates 53 and 54 will be opened. However, if only seven words are to be processed, with word 16 not being processed, the gate 55 will be opened and the gates 53 and 54 will be closed.

When eight words are to be processed, the information in all of the registers will be moved out serially to the output lead 56, the latter of which will lead to a suitable decoding circuitry not shown. The first word out will be word 16 from register A–1. This word will transfer out through the gate 53 to the buffer line connecting to the output lead 56. The word 15 in register A–2 will pass through the gate 54 back to the input of the register A–1 and will then follow the word 16 out through the gate 53 to the line 56.

As the word 15 leaves register A–2, the word 14 from the register B–1 starts moving in through gate 50 to follow the word 15 in register A–2. As the word 14 moves out of the register B–1, the word 13 in register B–2 is recirculating from the output thereof to the input of the register B–1 and, will eventually follow through the gate 50 into the register A–2. Similarly, as the word 13 moves out of the register B–2, the word 12 starts moving into this register B–2 through the gate 51. As word 12 moves out of register C–1, the word 11 recirculates from the register C–2 back to the input of the register C–1 and will eventually follow the word 12 out through the gate 51. This same process is repeated in the registers D–2 and D–1. Here, the word 10 will move in after the word 11 into register C–2 by way of the gate 52, and the word 9 will be recirculated back to the input of the register D–1 to follow the word 10 out through the gate 52 into the register C–2.

It will be seen from the foregoing that this form of circuitry permits simultaneous read-in from a plurality of input signal sources with the information in the plurality of registers being arranged for read-out serially through a single output.

In the event that only seven words are to be processed, the aforedescribed operation will take place except that the word 15 will move directly out to the gate 55 and the word 16 will not be processed. In all other respects, the movement of the information in the register will be as described in conjunction with the eight word processing cycle.

The active elements in each of the registers illustrated in diagrammatic form in FIGURE 8 are magnetic core elements of the saturable bistable type. These magnetic core elements are connected in a single core per bit configuration well known in the art and these registers may take the form illustrated in FIGURE 20, the latter configuration to be discussed in greater detail hereinafter. These registers are connected as serial registers and arranged so that as a shift pulse is applied to all of the cores of the registers, the information in each core is shifted along into the next core in the sequence.

Figure 9:
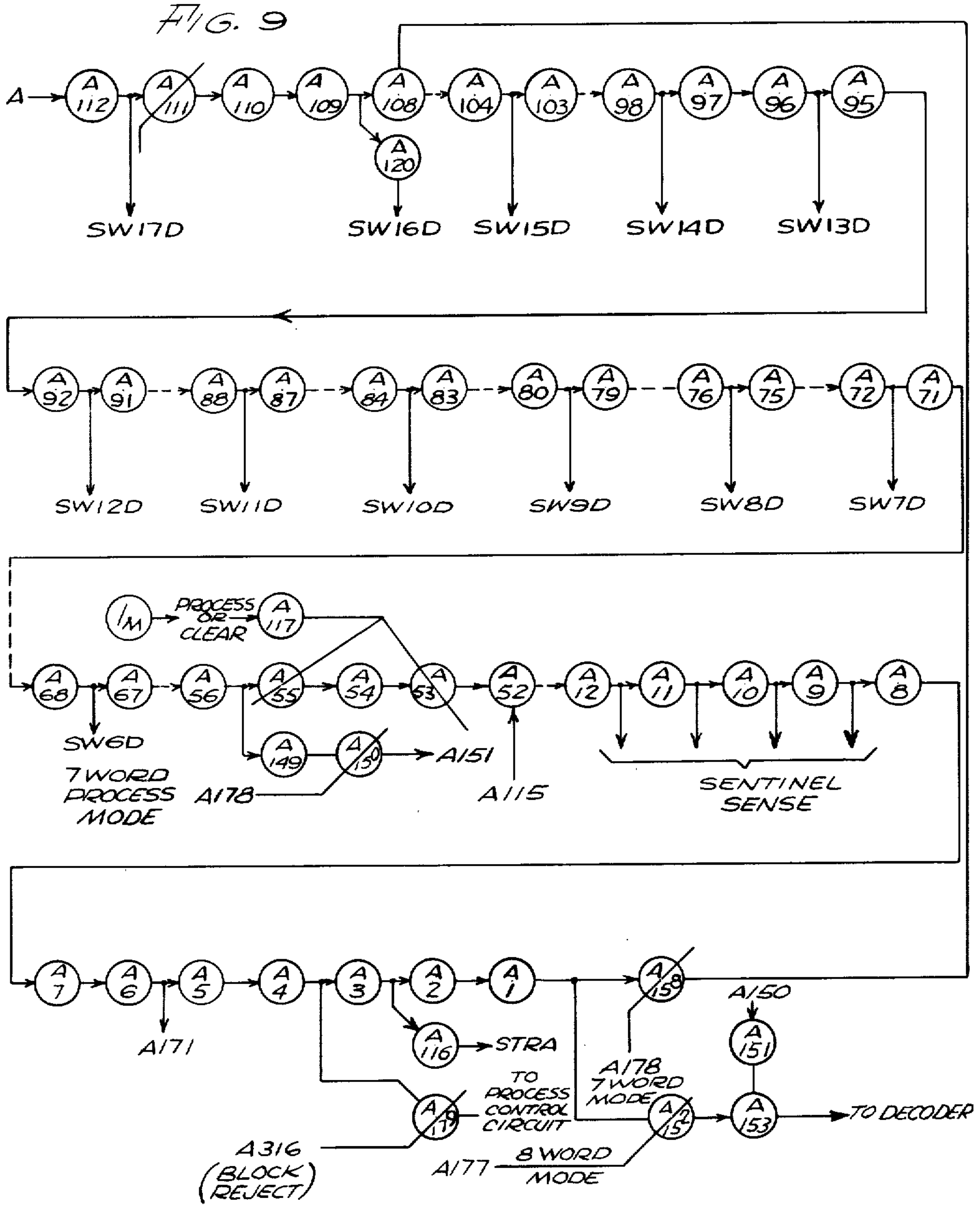
FIGURE 9 illustrates the logical arrangement of the magnetic core devices in one of the registers of the input register.

The A register is illustrated in logical detail in FIGURE 9. In this figure, each of the encircled numbers designates a magnetic core element which is adapted to store a bit of information. In addition, selected ones of the cores are arranged for performing logical functions. In FIGURE 9, the input to the register is on the core A112 and the information will, in the course of an input transfer, be shifted along through the cores A112 to the core A1.

When the information has been shifted into the register, the data may be transferred out by way of core A152 or core A158. Further, the data may be recirculated and in this instance, the data will move through core A158 back to core A108.

The information moving in the lines may be cleared by applying inhibit signals to selected cores in the circuitry. For example, to speed up the clearing of information from the register, inhibit pulses may be applied to the cores A55 and A53 by the core A117, the latter receiving an input signal calling for the clearing of information. The clearing signal may take the form of a series of pulses produced by a ones generator 1M. This circuitry may also be used for the processing mode of operation.

In addition, the register A has a number of output taps positioned therealong so that as the cores are being shifted, the information may be shifted not only serially in the register but also shifted out to other circuitry for monitoring and control purposes. Thus, the output of the core A112 connects to a switch SW17D. The output of core A109 feeds a further core A120 which in turn has an output connected to the switch SW16D. The cores 104, 98, 96, 92, 88, 84, 80, 76, 72, and 68 all have outputs leading to associated switches, the latter switches being illustrated in the FIGURES 13 and 14. Each of the cores A12, A11, A10 and A9 have outputs which are used for purposes of sensing the lead sentinel of the words supplied to the A register. These signals are utilized with the circuitry of FIGURE 13. It will be readily apparent that this circuitry is adapted to have other outputs used for other control purposes as a circuit designer may deem necessary.

Figure 10:
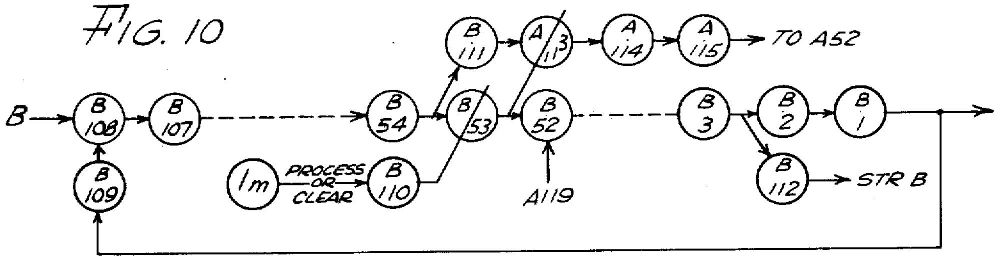
FIGURE 10 illustrates a further storage register of the present apparatus.

The coupling of the other registers into the present register illustrated in FIGURE 9 is accomplished by way of the core A52, the latter being coupled to a core A115 which serves as an output core for the B register illustrated in FIGURE 10.

Another output from the A register is the output used to stop the shifting relative to the supplying of input information to the register from the tapes. This output is taken by way of the lead sentinel passing from the core A3 into the core A16 and then shifting out to provide the stop tape read signal STRA.

An additional control function in the A register of FIGURE 9 is the control accomplished by inhibiting the core A158 in the event that only seven words in the registers of FIGURE 8 are to be processed. The inhibit signal will comprise a series of ones supplied from a core 178. When eight words are to be processed, an inhibit signal will be applied to the core A152 to block the flow of data to the decoder directly from core A1.

FIGURE 10 illustrates the B register in core logic form. As this particular register has as its prime function the storage of information from the input source B, and does not have the control functions associated therewith that are related to the register A, this register is considerably simplified in its detail. Here, the input is to the core B108 and the information in the core will be shifted from the input B through the register until such time as the lead sentinel for the words coming into the B register has passed from the core B3 to the core B112 and then out to produce the stop tape read signal STRB. Further, the output of the core B1 is arranged to feed back through the core B109 to core B108.

In the B register illustrated in FIGURE 10, the movement of the input information from the source B is prevented from passing to the output core A115, and thereby to the core A52 of the register in FIGURE 9, by the logical circuit which includes the cores B53, B111, and A113. It will be noted that if a pulse is shifted out of the core B54, it will be shifted into both the cores B111 and B53, assuming that the core B110 is inactive during a tape read operation. On the application of the next shift pulse, the core B111 and the core B53 will both be shifted and the output of the core B53 will be applied as an inhibit pulse to the core A113 to thereby eliminate or cancel out the pulse which would normally arrive at core A113 from the core B111. Thus, no information is shifted into core A113.

If the information in the register is to be processed, a series of ones are applied to the core B110 and these in turn will inhibit the core B53. The effect of this is to prevent the core B53 from having any output which would tend to inhibit the core A113. Consequently, the information will now be free to move from the core B54 through core B111, A113, A114, and A115 on to core A52 of the A register of FIGURE 9.

Figure 11:
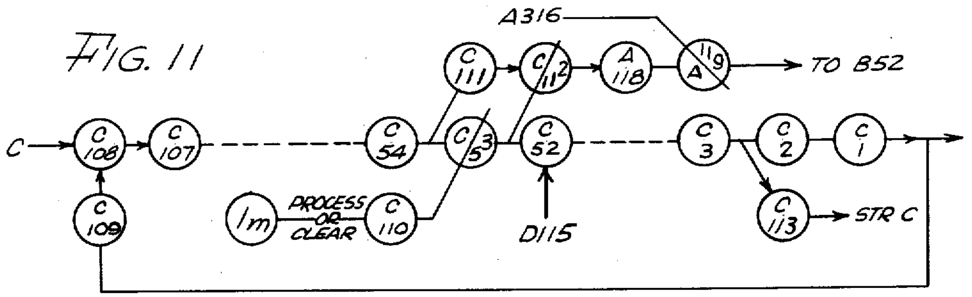
FIGURE 11 illustrates a still further storage register associated with the input register of the apparatus.

The C register of FIGURE 11 is coupled to the B register of FIGURE 10 by way of the core A119 and the input core B52 in the B register. Referring now to FIGURE 11, this register corresponds substantially identically to that of the preceding register B. The C register of FIGURE 11 incorporates one additional feature and that is an inhibit winding on the core A119 which is driven from the core A316, the latter having ones applied thereto when it is desired to reject or cancel the information in the register. The core A316 will supply to the inhibit winding on the core A119 a series of ones which will prevent any transfer of information from the core A118 to the output and then into the core B52. It will be noted that this inhibit or reject inhibit circuit corresponds to the inhibit circuit applied by core A316 to the core A179 on the output of the A register of FIGURE 9.

Figure 12:
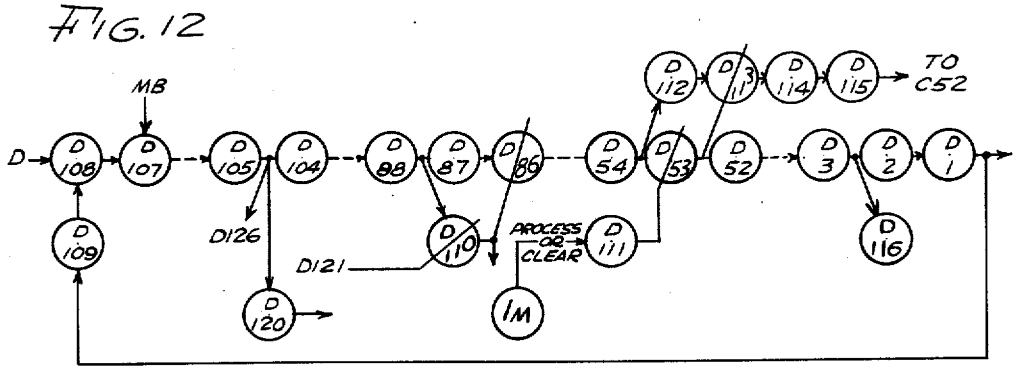
FIGURE 12 illustrates a modified form of the input register storage circuit which is arranged to perform more than one function in the apparatus.

The D register of the register illustrated in FIGURE 8 is further illustrated in logical detail in FIGURE 12. It will be noted that this register is basically the same as that of the registers B and C illustrated in FIGURES 10 and 11. That is, there is an input core D108 and a series of cores arranged for serial read-in of information from the source D. The output core for stopping the input shift is the core D116, the latter having its output arranged to provide the stop tape read signal STRD for the D register. When information is to be shifted out of the register into the C register, the process signal source will be active and will provide through core D111 signals for inhibiting the core D53 and thereby permitting the information to move through core D54 into the cores D112, D113, D114 and D115 on to the core C52.

The register of FIGURE 12 includes an additional feature in that it utilizes a portion of the register for a counting function. This is accomplished by inserting into the core register at D107 a monitor bit MB, the latter being derived from the core M190 having appropriate input logic thereon. When the monitor bit MB is inserted into the core D107, it is arranged for transfer down through the cores of the register for use in suitable timing and control functions. For example, when the monitor bit moves out of the core D105, it will move out to a core D120 as well as onto the core D104. From the core D120, the monitor bit may be shifted out for a suitable control purpose, not shown or herein described.

The monitor bit is then further arranged to pass down to the core D88 and then be shifted out into the cores D87 and D110. When the monitor bit is shifted from the core D110, it will also be shifted out of the core D87 and the inhibit winding on the core D86 will be activated by the output of the core D110 to thereby cancel or kill this monitor bit and prevent it from moving any further down the register. The output of the core D110 is also arranged for connection to another suitable circuit, not shown, where the monitor bit may be used for timing and control functions. The core D110 may also have an inhibit winding thereon from a source core D121 having a control pulse thereon to prevent the monitor bit from loading the core D110 or to prevent any other information moving in the register from activating the inhibit circuit on the output thereof.

Figure 13:
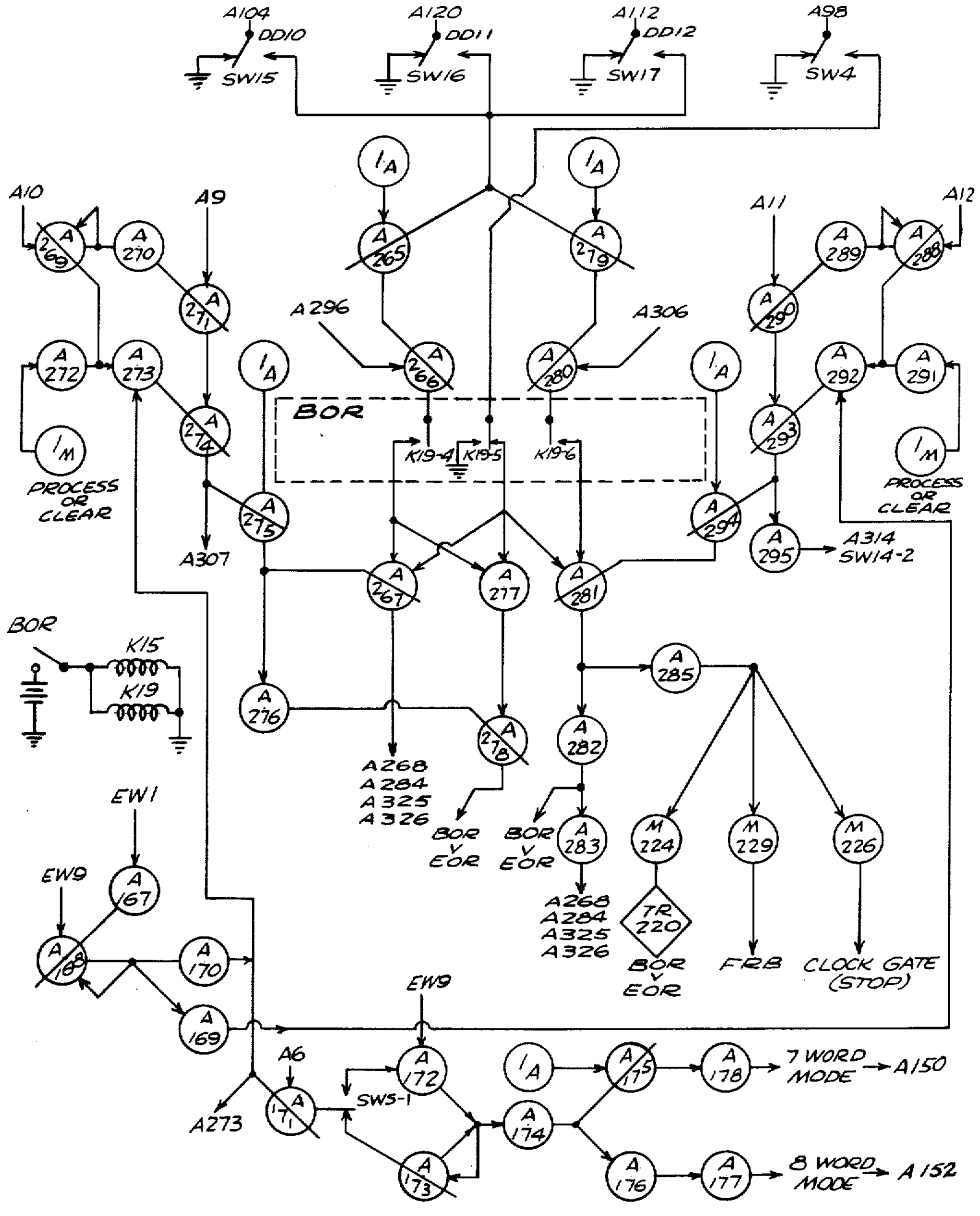
FIGURE 13 illustrates a portion of the core circuitry associated with the sensing of control information from the input register.
Figure 14:
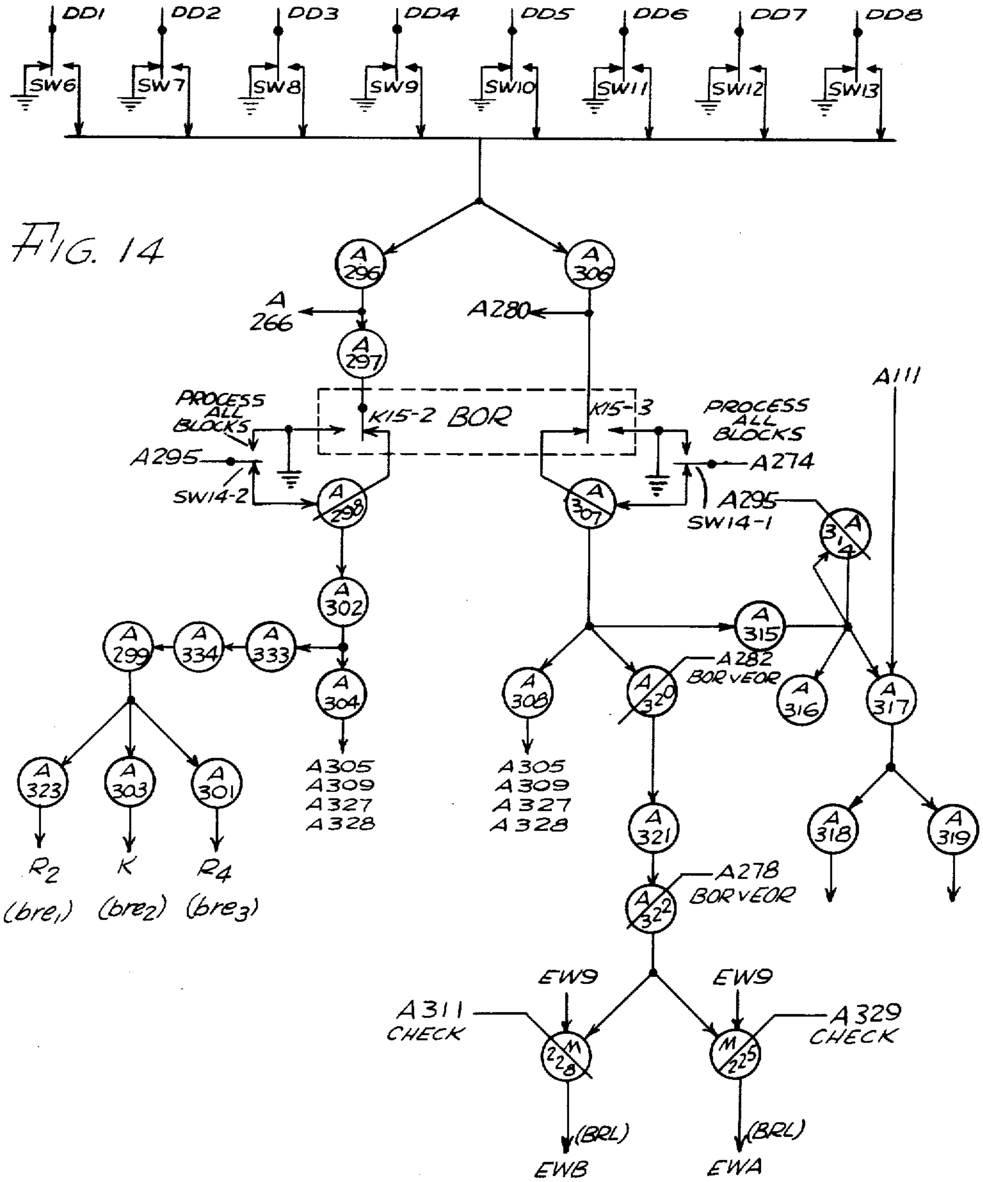
FIGURE 14 illustrates a further portion of the electrical circuit used for sensing the information stored in the input register.
Figure 15:
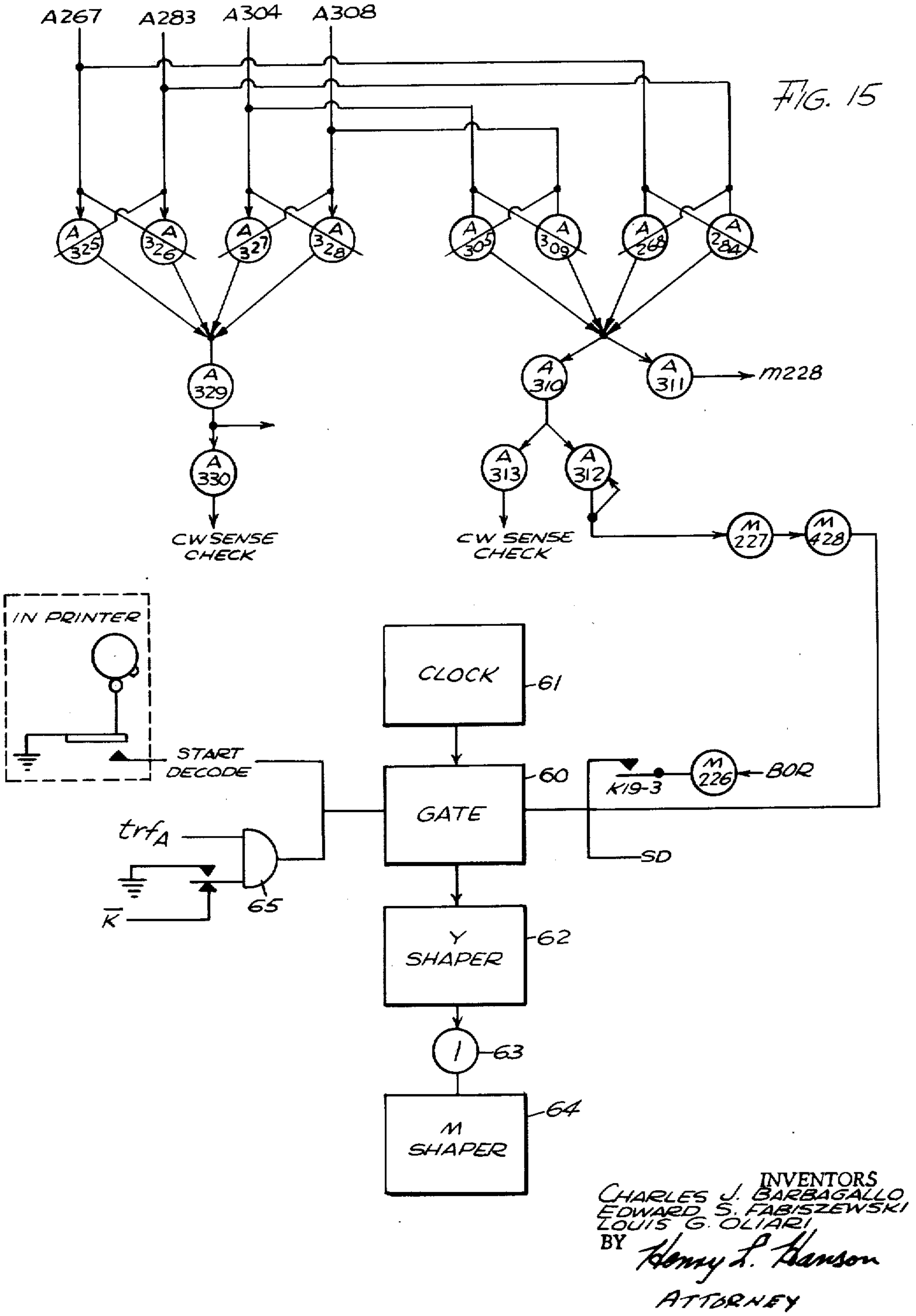
FIGURE 15 illustrates the logical core circuitry and the manner in which the check circuitry is associated with the timing or clock functions of the over-all circuits.

The circuits of FIGURES 13, 14 and 15 illustrate the basic control and check functions associated with the reading of information from the A register of FIGURE 9. The circuitry illustrated in these figures is arranged to detect whether or not there is a beginning of run BOR or end of run EOR code received in the control word. In addition, the circuitry is arranged to detect whether or not a particular blockette is to be accepted or rejected.

The particular circuit illustrated has been arranged so that the beginning of run code is selected from the word 16 in the register A. The beginning of run code is further selected from one of eight decimal digit locations 1–8 and one of three decimal digit locations 10, 11, or 12. By definition in the present circuit, the presence of a binary coded decimal 5 in two selected decimal digit locations will produce the desired code for a beginning of run signal. For example, if the decimal digits 8 and 10 in the word 16 are both a binary coded decimal 5, an output signal will be produced indicating that there is a beginning of run code signal present. The circuit is so arranged that when the beginning of run signal is detected in a block, theapparatus will stop the tape, reverse the tape one block and then wait for manual intervention before continuing operation.

Considering FIGURE 13 more specifically, the circuit will be seen to comprise a series of manual switches SW15, SW16, SW17 and SW4, each of the single-pole, double-throw type. These switches are arranged for manual setting at a control panel by an operator in order to select one of the two digit locations required for a particular beginning of run code in the case of the switches SW15–SW17, or to select the end of run code from the switch SW4.

The ungrounded contacts of the switches SW15–SW17 are all buffered together to a common line which feeds to the inhibit winding on a pair of cores A265 and A279. The cores A265 and A279 have a ones generator connected to the input thereof to supply a series of pulses, one pulse for each shifting in the A register. The output of the cores A265 and A279 are applied to the inhibit windings of cores A266 and A280, the latter receiving selected signals from the circuitry of FIGURE 14.

The cores A266 and A280 are arranged for coupling into the cores A267 and A281 respectively when the beginning of run relays K15 and K19 are energized by the operator. The signals will be received or rejected in the cores A267, A277 and A281 in accordance with a control sense signal which is derived from the lead sentinel passing through the A register.

The sensing of the lead sentinel is accomplished by the circuitry coupled to the A register at cores A9, A10, A11, and A12. The signal from the cores A9–A12 are arranged to generate a preselected code which is compatible with the binary coded decimal digit 5 in order to provide the desired coding for the sensing of information from the decimal digit locations of the control word 16. The lead sentinel is, in effect, picked off in two specific circuits which may be termed one and only one circuits. These circuits are arranged so that the lead sentinel will produce a single pulse on the output and will produce no further output pulses even though additional information may be following the lead sentinel along the A register cores. More specifically, when a bit is received from the core A12 on the core A288, this core will be set and will act as a ones generator so that each time that a shift pulse is applied thereto it will be read out and the signal will again read back into the core. The signal first read out of core A288 is read into the core A289. This core A289 will be set at the same time that the core A290 is set by the lead sentinel being read out of the core A11. On the next shift, the core A289 will apply an inhibit signal to the core A290 and the signal which was in core A290 will be read into the core A293. The lead sentinel will then pass out of the core A293 to the inhibit winding on the core A294 and also into the core A295. When the core A295 is shifted, the signal on the output thereof is read into the core A314 on the inhibit winding thereof as illustrated in FIGURE 14.

In a similar manner, the lead sentinel in the A register will be sensed by core A10 and then by core A9. Here, the signal read into the core A269 will set this core and this core will continue to act as a ones generator until an inhibit pulse is applied thereto. On the next shift, the signal is read out of the core A269 into the core A270 and this will occur at the same time that the lead sentinel is applied to core A9 into the core A271. On the following shift, the core A271 will be read out into the core A274 and no further information can be coupled into the core A271 due to the signals being shifted out of the core A270. The signal from the core A274 will shift out and will be applied to the inhibit winding of the core A275 and also to the input of the core A307 in FIGURE 14.

The "one and only one" circuits are arranged to be cleared during the processing cycle by the ones generator 1M which is arranged to feed ones to the cores A272 and A291 respectively. The output of the core A272 feeds an inhibit winding on the core A269 and also the assert core A273, the latter supplying inhibit signals to the inhibit winding on the core A274. The core A291 has its output coupled to the inhibit winding of the core A288 and also is arranged to supply signals to the core A292. The output of the core A292 is arranged to feed the inhibit winding A on the core A293.

The outputs from the cores A267 and A283 are arranged for application to the checking circuits illustrated in FIGURE 15, the latter producing an output pulse if there has been an error. The output of the cores A278 and A282 are used to designate the presence of a beginning of run code or an end of run code, the latter being indicated when the end of run switch SW4 has been manually set.

The circuitry of FIGURE 13 additionally includes output cores M224, M229, and M226. The core M224 is used to fire a thyratron relay TR220 to produce a visual indication of a BOR V EOR signal. The core M229 is used for controlling the direction of movement of the tape. In this regard, the output of this core will supply a signal to effect a repositioning of the tape so that it will be ready to have the block containing the beginning of run code reread when the processing cycle is initiated. The output of the core M226, if once set to indicate a BOR signal, is used in conjunction with the controlling of the timing pulses of the clock which drives the shift pulse generators associated with the circuitry, as illustrated in FIGURE 15.

FIGURE 14 illustrates in greater detail the selection and checking circuitry associated with the decimal digit locations DD1–DD8 of the control word 16. These decimal digits are arranged to be selected by the manual switches SW6–SW13, only one of which will be on at any one time, the outputs of which are all buffered together to a common buffer line feeding to the cores A296 and A306. As pointed out above, if a particular decimal digit has a binary coded decimal 5 therein, this code for the 5 will be fed out through the particular manual switch to the cores A296 and A306. The cores A296 and A306 have outputs to the cores A266 and A280, respectively, in FIGURE 13. In addition, the signals are coupled through the beginning of run relay switches K15–2 and K15–3 for selective application to the inhibit windings on the cores A298 and A307. This latter inhibiting function will occur only when the relay contacts are in a de-energized state as indicated when the circuit would be examined for a block reject. The lead sentinel detected from the circuit of FIGURE 13 at cores A295 and A274 is arranged for application to the cores A298 and A307 through the associated switches SW14–2 and SW14–1 respectively. The output of the core A298 feeds into core A302 and then into the core A304, the latter supplying a signal to the sense check circuits of FIGURE 15. In a similar manner, the output of the core A307 feeds into the core A308 and thence to the check sense circuits of FIGURE 15. Information from the core A302 is also arranged to pass through the cores A333, A334, and A299 and thence to the cores A323, A303, and A301 the latter being used in conjunction with the tape and channel control circuits to be described hereinafter.

The core A315, which is adapted to be set by the core A307, feeds a ones generator A314 in the form of a magnetic core flip-flop. In addition, the core A315 feeds a core A316 and a further core A317. The core A317 supplies an output to a pair of cores A318 and A319 which are adapted for use in performing selected control functions.

The core A320, when set and shifted, will feed a signal into the core A321 and then to the core A322. The output of the core A322 is coupled to the cores M228 and M225 and will set these cores providing there is no signal on the inhibit windings associated therewith. These cores will be read out to produce signals EWA and EWB which are used as tape start movement control signals. The cores M228 and M225 will not be set if a beginning of run code BOR or end of run code EOR produces the signals necessary to inhibit the cores A320 and A321. Similarly, if there has been an error, a check pulse will be applied to the cores M228 and M225 to inhibit the setting of these cores.

FIGURE 15 illustrates the control word CW sense check circuits. These circuits are so arranged that the outputs of the cores A267, A283, A304, and A308 are applied to the cores A325, A326, A327, A328, A305, A309, A268, and A284 to prevent a pulse from being fed out to the core A329 or the cores A310 or A311 if the signals on the inputs appear at the same itme. It will be noted that the cores A325 and A326 are connected in an exclusive "OR" configuration such that there will be no output signal from the cores if there is a simultaneous input from the cores A267 and A283. The cores A327 and A328; A305 and A309; and A268 and A284 are also connected in this exclusive "OR" configuration.

If a signal appears at the output of the core A330 or the core A313, it is desired that an appropriate signal be generated to indicate that an error has occurred. Consequently, these check sense pulses may be used to operate appropriate indicators or relays, not shown, when there is an output signal. The core A312 is connected as a flip-flop which will produce a series of pulses when set and has its output connected by way of cores M227 and M428 to a gate 60, the latter of which is used to selectively gate a clock pulse generator 61 to control the output which supplies signals to the Y shaper 62. The Y shaper is the shaper used for shifting the cores in the input register during a processing operation. The output of the Y shaper, in addition to supplying the shift pulses for the cores in the input register, will also supply a signal to the ones generator 63 which in turn supplies a signal to the M shaper 64. The M shaper 64 is used to supply the shift pulses for the M cores of the circuit. One of these cores will be the core M428 which is connected between the core A312 and the input buffer line to the gate 60. Thus a control word CW sense pulse once read into the core A312 will be stored therein until such time as the processing starts when the M shaper 64 is active. If the core A312 is storing a sense pulse, it will be shifted out through the core M227 and M248 and will be used to close the gate 60, thereby preventing the further shifting of information.

The gate 60 is arranged to be opened by a start code signal derived from the printer or by suitable tape control signals coming in through a further gating circuit 65. The gate 60 is arranged to be closed by a beginning of run signal BOR and a further tape control signal *s*D as well as a signal from the core M428.

Figure 16:
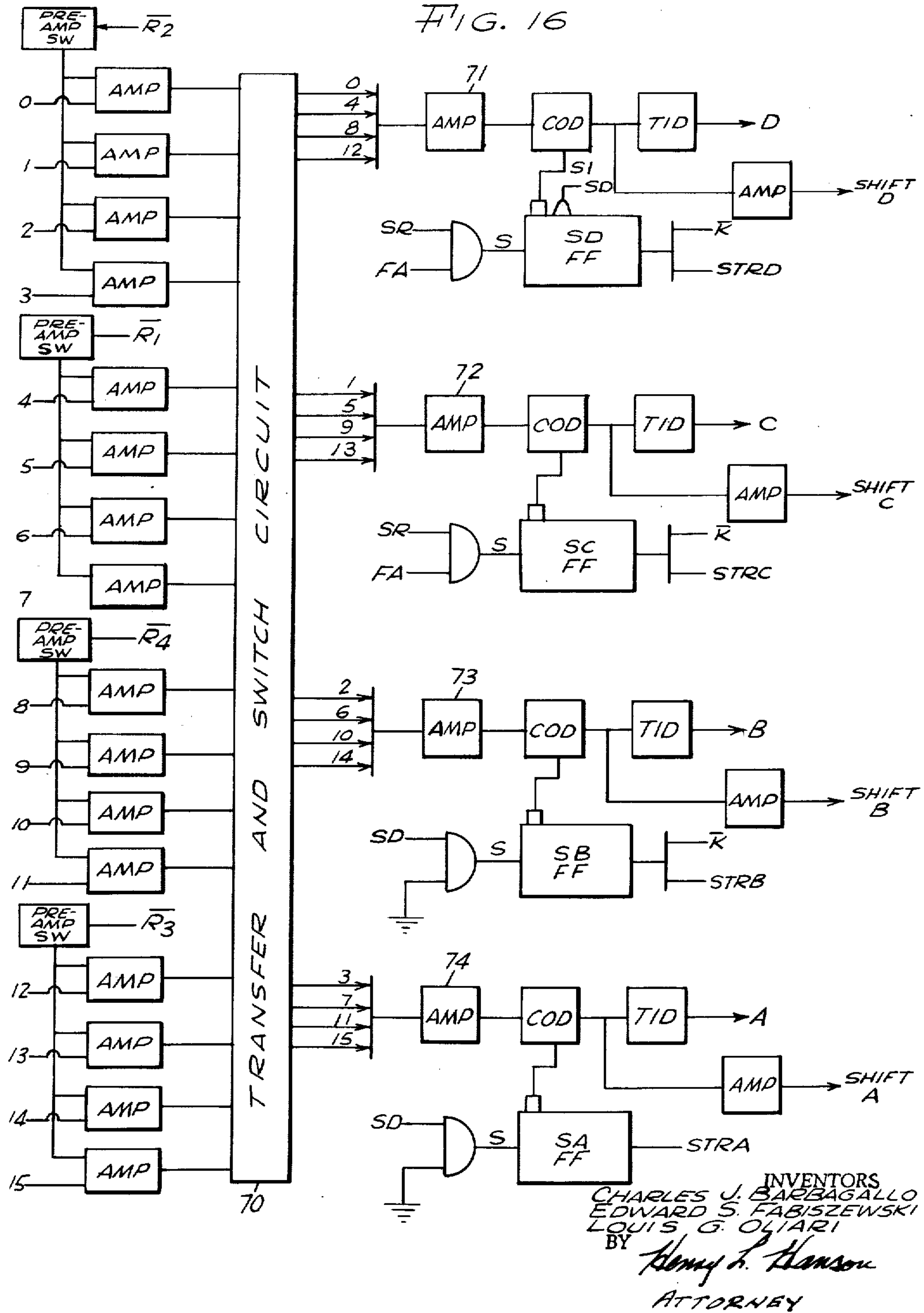
FIGURE 16 illustrates the logical arrangement of the tape reading circuits.

FIGURE 16 illustrates diagrammatically the arrangement of the sixteen record channels of the record tape in terms of the reading circuitry therefor. It will be noted that the reading channels are divided into groups of four with channels 0–3 forming the first four channels, 4–7 forming the second group of channels, 8–11 forming the third group of channels, and 12–15 forming the fourth group of channels. In circuit with each of the reading heads is a preamplifier which is arranged to amplify the signal received from a magnetic recording and reading head. Also associated with this preamplifier is a preamplifier switch which is arranged to selectively activate the associated preamplifiers of the four channels to which the preamplifier switch is connected. The signals for activating the preamplifier switches are derived from a counter or memory circuit producing the signal R1, R2, R3, and R4.

The outputs of the preamplifiers are connected through a suitable transfer switch circuit 70 which connects the outputs of the preamplifiers so that when any particular preamplifier switch is active, the four channels associated therewith will be applied to the four output lines A, B, C, and D in order to supply the appropriate signals to the input register. More specifically, the output of the circuit 70 is arranged so that the channels 0, 4, 8 and 12 all buffered together to the input of an amplifier 71. Further, the channels 1, 5, 9, 13 are all buffered together to the input of a further amplifier 72. Channels 2, 6, 10 and 14 are buffered together to the input of a further amplifier 73. Channels 3, 7, 11 and 15 are all buffered together to a fourth amplifier 74.

On the output of each of the amplifiers 71 through 74 is a crossover detector COD which is arranged to produce on the output thereof a series of pulses, one for each bit, whether a zero or a one is received from the amplifier on the input thereof. This crossover detector further has a gate therein which is arranged to be selectively opened or closed by a flip-flop switching circuit connected thereto. When the crossover detector has output signals, the signals are applied to two circuits, one of which is a time interval detector TID which is arranged to produce on the output thereof a single pulse for each digit one present in the output of the crossover detector and no output pulses for any zeroes present. In addition, the crossover detector output is applied to a further amplifier which produces the shifting pulses used in driving the associated register in the converter circuit.

The flip-flops used for controlling the signal gating within the crossover detectors associated with each of the four channels in operation are arranged to be set whenever there is an input signal indicating that a start read signal SR is present. This start read signal SR, the source of which is not shown in the present disclosure, is equivalent to a beginning block mark of the type associated with the above described Schrimpf application. The SR signal is applied to the flip-flops SC and SD. The pulse output from the flip-flop SD, at *s*D, is used to control the flip-flops SA and SB. The flip-flops will remain set until a stop tape read signal is received, said signal being identified by the code letters STRA, STRB, STRC, and STRD for the four channels A, B, C, and D respectively. As pointed out in FIGURES 9, 10, 11, and 12, when the lead sentinel has advanced into the associated register to a predetermined point, it will move out and create the stop tape read signal STR which has the effect of switching the associated flip-flop SA, SB, SC, or SD back to the reset state so that no further shifting will take place and the crossover detector amplifier will be deactivated.

The details of the read circuits illustrated in FIGURE 16 may be found in a co-pending application of Kenneth E. Perry entitled "Information Storage Record and Apparatus," Serial Number 601,400, filed August 1, 1956.

Figure 17:
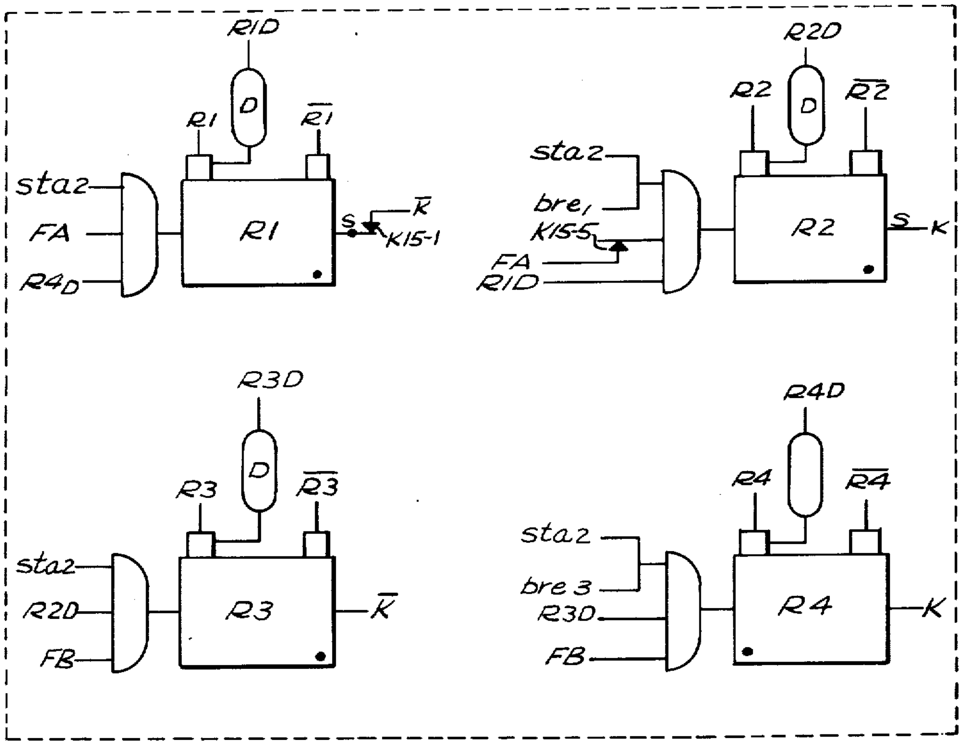
FIGURE 17 illustrates a channel memory circuit associated with the tape controls incorporated with the present invention.

The signals for the preamplifier switches are supplied by the circuitry diagrammatically illustrated in FIGURE 17. In FIGURE 17, there are four flip-flop circuits for producing the read functions R1, R2, R3, and R4. These circuits are arranged so that during the course of a normal read they will be activated in the sequence R1, R2, R3, and R4.

At the start of any conversion problem, the flip-flops R1–R4 are all set in the manner indicated by the dots on the blocks therefor. This will have the effect of switching the flip-flops R1, R2 and R3 so that the output lines $\overline{R1}$, $\overline{R2}$, and $\overline{R3}$ are active. The flip-flop R4 will be set so that the output line R4 and R4 delayed (R4D) are active. With the counter circuit so set, the first flip-flop conditioned to be rendered operative will be the flip-flop R1 having a gating circuit on the input thereof to which the start signals *sta*2, R4D, and the forward function FA are applied to switch the flip-flop so that the line R1 becomes active.

As soon as R1 is active, the signal R1 will be supplied to the appropriate preamplifier switch, FIGURE 16, so that the channels 4, 5, 6, and 7 may be read.

With the flip-flop R1 set so that the output line R1 is active, a predetermined time later the output line R1D will be active and this will condition one of the gate legs on the input of the flip-flop R2. As soon as the next start signal *sta*2 is received, with the function FA present, the flip-flop R2 will be switched to the active state so that the output line R2 will have a signal thereon. A predetermined time later, the signal line R2 delayed (R2D) will have a signal and this signal will be used to condition the gate on the input of the flip-flop R3. In a similar manner, the output of the flip-flop R3 will be used to condition the input gate of the flip-flop R4 so that the circuit may be switched or stepped sequentially through four steps. The flip-flops R1 and R3 are arranged to be set by the signal $\bar{k}$ while the flip-flops R2 and R4 are arranged to be reset by the signal *k*. These latter signals are derived from the circuitry illustrated in FIGURE 19. For a beginning of run operation, the relay contacts K15–1 and K15–5 are opened to prevent resetting R1 and to keep R2 from being set. This will mean that only four channels from each block will be read until the apparatus is switched over to the normal process mode. When processing data, should there be a block reject, the apparatus is arranged to switch quickly between R1 and R3 so that the channels associated with R2 and R4 may be bypassed. The functioning here will be discussed in detail below.

Figure 18:
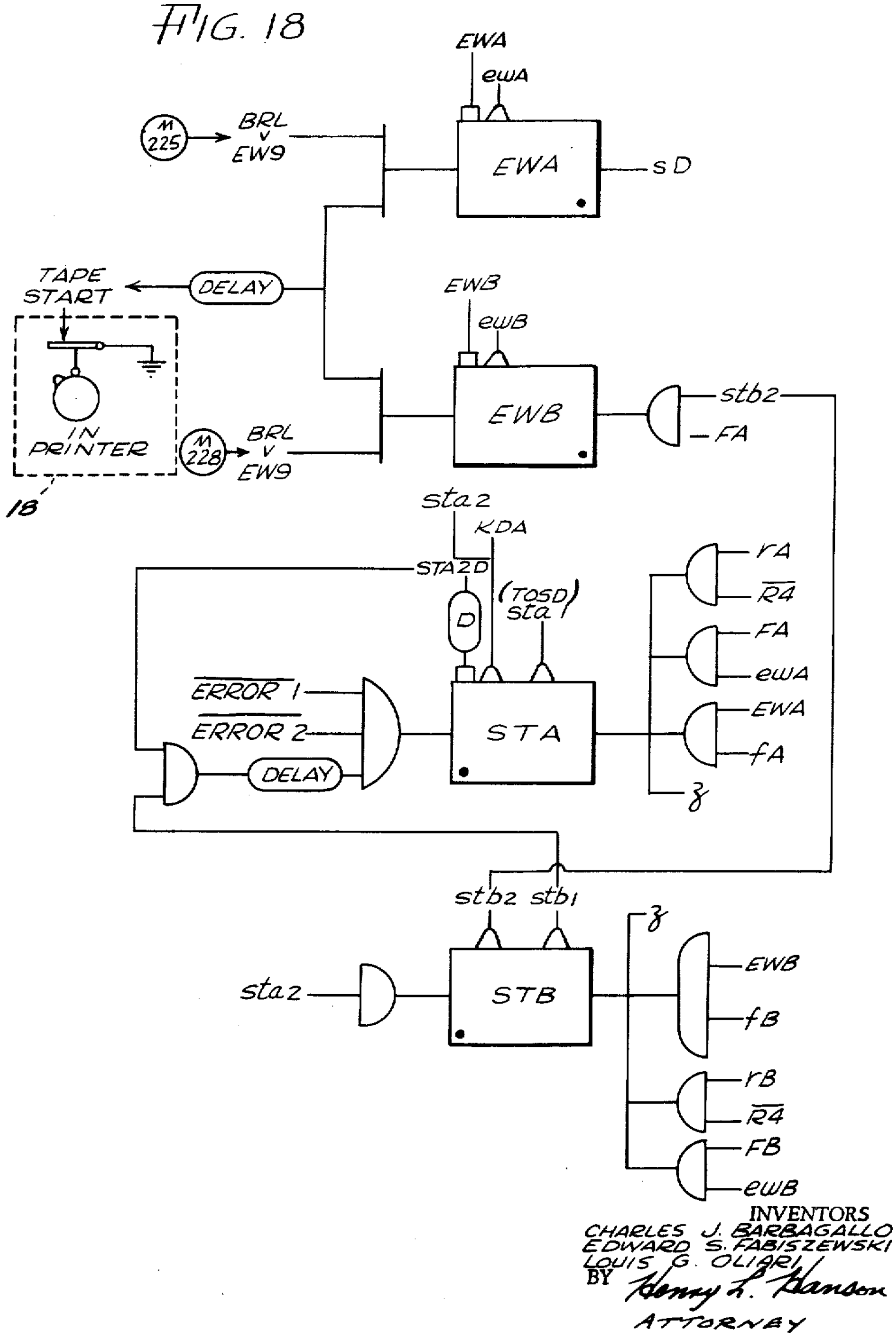
FIGURE 18 illustrates further circuitry incorporated in the tape control circuits.

FIGURE 18 illustrates the circuitry utilized for the starting of the tape. This circuitry comprises four flip-flops EWA, EWB, STA and STB. The flip-flops are normally set in the manner indicated with the side active corresponding to the side where the dot is located in the block for the flip-flop. In order to start the tape moving, a tape start signal is derived from a timing cam in the printer or punch and is shaped by means, not shown, so that it may be used as a signal pulse. This tape start signal is passed through a suitable delay network and applied to the inputs of the end of word flip-flops EWA and EWB to switch the flip-flops to the opposite state so that their outputs EWA and EWB are both active. The EWA and EWB flip-flops may also be reset by a begin read signal BRL or an end word signal EW9. The flip-flop EWA is adapted to be set by the signal *s*D derived from the SD flip-flop of FIGURE 16. The flip-flop EWB is arranged to be set by the presence of a signal *stb*2 from the start flip-flop STB and a tape directional control flip-flop signal FA from the circuits of FIGURE 19.

The two end of word flip-flops, EWA and EWB, have their outputs coupled to the start flip-flops STA and STB and will switch these flip-flops, providing certain other signals are present, to the opposite state.

It will be noted that the start flip-flop STA has three separate input gates on the reset side, any one of which, if the gate legs thereon are active, will be effective to reset the flip-flop. The first of these gates has two inputs *r*A and $\overline{R4}$ and is used to reset flip-flop STA when a tape movement directional control signal *r*A is received from a tape directional control flip-flop FRA in FIGURE 19 and the counter signal $\overline{R4}$ is received from the counter flip-flop R4 in FIGURE 17. The second of these gates has two inputs FA and *ew*A. The input FA also comes from the tape movement directional control flip-flop FRA and the input *ew*A comes from the end of word flip-flop EWA. The third of these gates will, if an end word signal EWA is present and a directional signal *f*A is present, function to switch the flip-flop STA to its reset state. Similar gating circuits are provided for the flip-flop STB except that the signals therefor are from the duplicate B functions for the end of word and directional circuits EW and FR. The start flip-flops STA and STB are self-setting with a delayed STA2D signal setting the flip-flop STA, providing no error has been sensed, and the signal *stb*1 has been produced by the flip-flop STB. The flip-flop STB will be set by a *sta*2 signal from the flip-flop STA. One of the principal outputs derived from the start flip-flops is the tape order start signal *sta*1 or TOSD. This latter signal is arranged for application to tape control circuits to indicate that a tape movement should take place. The flip-flop STB will have its output arranged to switch the flip-flop STA back to its starting state by the output *stb*1, the latter being buffered together with the delayed signal STA2D on the output of a flip-flop STA. This will produce the KDA pulse on the output of the flip-flop which in turn is used in the tape control circuits.

The tape control circuits adapted to co-operate with the circuits diagrammatically shown in FIGURE 18 are considered in greater detail in the above mentioned co-pending application of Henry W. Schrimpf.

Figure 19:
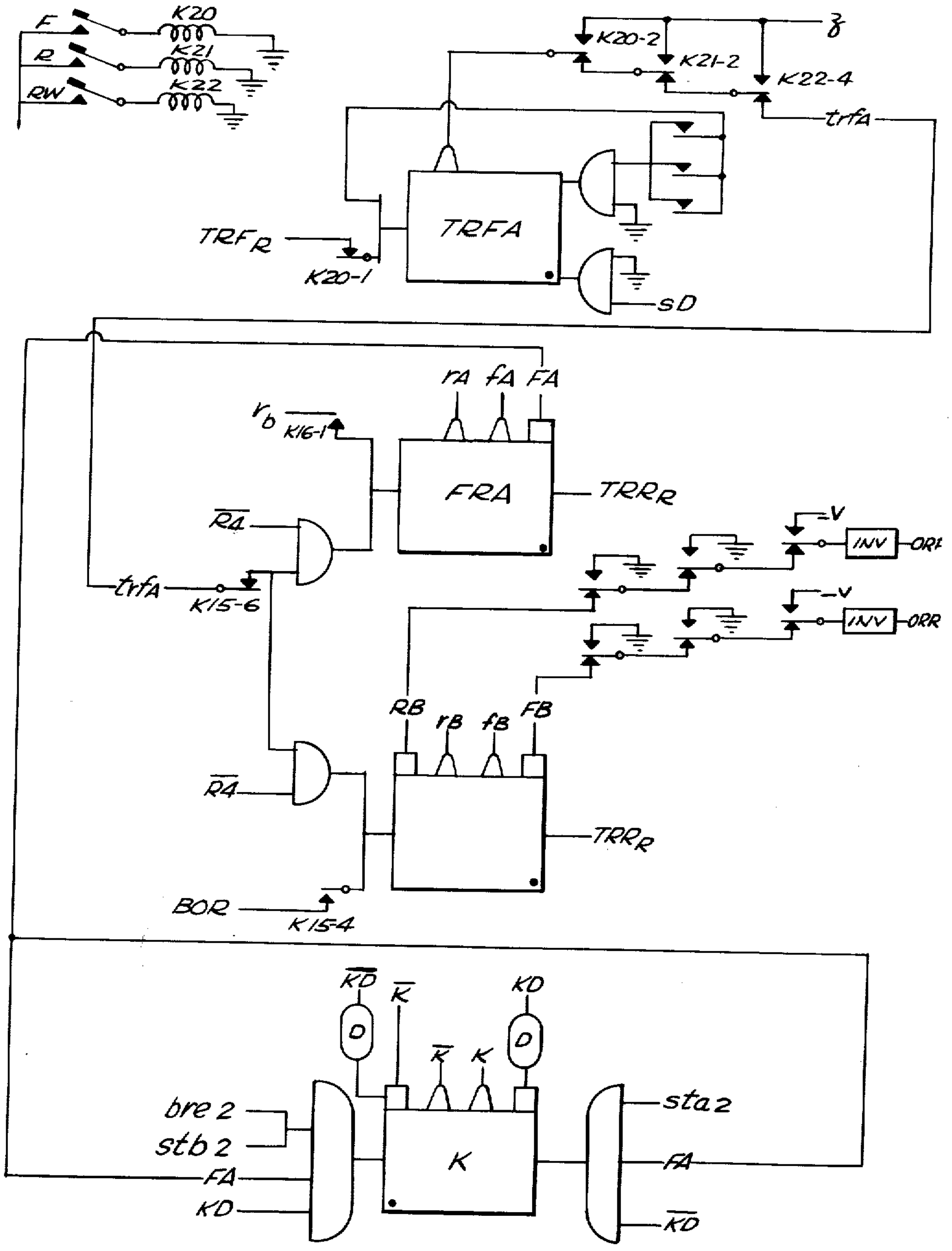
FIGURE 19 illustrates the tape control circuits for controlling the direction of movement of the tape in the course of a transfer of information.

The control circuits of FIGURE 18 co-operate directly with the circuits of FIGURE 19, the latter diagrammatically illustrating the circuits for controlling the direction of movement of the tape. This direction will be determined by whether or not the tape is being moved in conjunction with a reading operation or whether the tape is being reversed in order to position the tape with respect to the reading head so that a reading operation may take place.

There are three tape movements required for effecting the desired transfer of data from the record tape into the present converting apparatus. These three movements are forward, reverse, and rewind. The blocks of data are always read in the forward direction. Further, since each of the blocks is normally read with at least four forward passes, it is necessary that provision be made for the tape to be reversed to position it for the next reading of a particular block. The forward and reverse movements are illustrated for a normal processing operation in FIGURE 5. The rewind operation is required for winding the tape onto one of the supply reels after a particular processing problem is completed. The forward and reverse movements of the tape with respect to a particular block may be manually or automatically controlled while the rewind is a manually initiated operation.

In FIGURE 19 there is illustrated the manual controls including a forward switch F controlling a relay K20, a reverse switch R controlling a relay K21, and a rewind switch RW controlling a relay K22. In addition, the circuitry of FIGURE 19 includes four flip-flops TRFA, FRA, FRB and K. The flip-flops FRA and FRB are duplicated for checking purposes and the output of the flip-flop FRB is used to produce the output signals, order read reverse ORR and order read forward ORF. The flip-flop TRFA is utilized to provide a single block control. The flip-flop K is used to assist in the selecting of the particular four channels being read from the tape. Flip-flop TRFA is used for accepting the end block mark signal indicated by the signal TRF and produces an output signal which is used in controlling the directional flip-flops TRA and TRB. The functioning of the circuits of FIGURES 18 and 19 are discussed in greater detail hereinafter in conjunction with the overall operation of the converter apparatus described.

Figure 20:
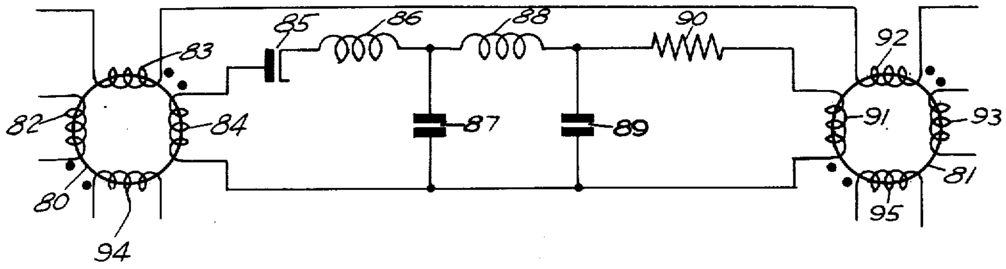
FIGURE 20 illustrates the schematic arrangement of a pair of magnetic cores adapted for use in the registers and logical circuitry of the present invention.

FIGURE 20 illustrates typical basic magnetic core circuitry which may be incorporated in various portions of the apparatus. In this figure, the core 80 and the core 81 are formed of a bistable magnetic material which is capable of being set into one or the other of two mutually exclusive states. The core material used in such apparatus is selected from the family of materials which have a rectangular hysteresis characteristic with a large residual flux when the core is driven into one or the other of two saturated states of the core.

In order to set the core 80 into a desired state, an input winding 82 is adapted to have a signal applied thereto which will drive the core into a saturated state and the core will remain set in that state. When a shift pulse is applied to the core 80 by a shift winding 83, the shift pulse will switch the core back to its original state, if it had been set by a signal on the input winding 82. The switching of the core 80 will induce a signal in the output winding 84, the latter of which is arranged to pass through a diode 85 and a choke coil 86, to charge a condenser 87. The diode 85 will prevent any back flow of the charging current going into the condenser 87 and consequently the condenser 87 will discharge along the delay line formed by the condenser 87, the coil 88, the condenser 89 and the resistor 90 into the input winding 91 on the core 81. If the core 81 is set, it will be reset by the next shift pulse applied to the shift winding 92 and the core will then be read out into the output winding 93.

The foregoing type of magnetic core circuit is sometimes referred to as a single core per bit storage register. In order to perform logic with this type of circuit, additional windings may be placed on each of the cores 80 and 81, such windings being illustrated at 94 on core 80 and 95 on core 81. The windings 94 and 95 may be used either for writing information into the cores 80 and 81 respectively or for preventing the writing of a signal from the normal input windings 82 and 91. Thus, if an input signal is coming in to the winding 82, the effect of that signal on the core 80 may be cancelled out or inhibited by an opposing signal in the core 94. In other words, if the flux from the winding 94 cancels the flux from the winding 82, nothing will be written into the core 80. In a similar manner, the flux from the winding 95 may be used to cancel the flux induced in the core 81 from the winding 91. It will be apparent that other windings may be added to this circuitry in order to extend the use of the circuit into various forms of logical circuitry.

A more detailed analysis and discussion of this type of magnetic core circuitry will be found in a copending application of Edward Ziolkowski bearing Serial Number 645,839, and filed March 13, 1957, now U.S. Pat. No. 2,981,934.

*System Operation*

In considering the overall operation of the apparatus described in the present application, it is first assumed that a beginning of run mode of operation is to be performed. In this beginning of run mode, the circuitry is arranged to search the record tape until such time as a particular group of information is found on the record tape. As soon as the particular group desired is found, the machine will be stopped and can be continued only upon an operator manually intervening on the controls to start the desired processing operation. On the beginning of run mode, the beginning of run relays K15 and K19 are activated so that the contacts of these relays will be shifted to the position opposite that illustrated in the drawings. The K15 and K19 relays are shown with their manual switch in FIGURE 13. In searching the tape for a beginning of run code combination, the search of the tape will be carried on in the manner illustrated in FIGURE 4 with a check being made only in that portion of the first blockette wherein the sixteenth word is located. Thus, in FIGURE 4, only the words 9 through 16 in the blockette 25 are read into the input register and checked for the desired control data.

For purposes of explanation, it is assumed in the representative operation hereinafter described in connection with the beginning of run mode that the beginning of run for the desired group is identified by the number 5 being written in the word 16 at the decimal digit locations 5 and 10. In other words, the decimal digit 5 in the control word 16 will be a binary coded decimal 5—0101. Similarly, the indicator for the decimal digit 10 will be a binary coded decimal 5—0101.

When the apparatus is placed in operation, the basic timing signal for starting the apparatus is derived from the printer or punch which is the output device of the combination. A tape start signal, or read next block signal, is received from the printer at approximately five degrees from the start of the printer cycle. This tape start signal is fed through a delay network to the tape motion demand flip-flops EWA and EWB, FIGURE 18, to switch these flip-flops so that the output lines EWA and EWB are both set.

When set by the tape start signal, the flip-flops EWA and EWB will produce output signals *ew*A and *ew*B which are applied to the set gate inputs on the tape position sequence flip-flops STA and STB. Thus, since the functions FA and FB are both present due to the FRA and FRB flip-flops being in the reset state, indicated in FIGURE 19, the presence of the signals *ew*A and *ew*B will be effective to switch the flip-flops STA and STB to the set state. When so switched, these flip-flops will produce outputs ***sta*1 and *stb*1. The *sta*1 signal creates a tape motion demand signal and the *stb*1** signal feeds back to the gate on the reset side of the flip-flop STA to switch the flip-flop STA back to the reset state. The resetting of the flip-flop STA produces the output pulse KDA which is used to initiate tape motion in the tape control circuit and directs that the tape be moved in a forward direction. The movement in the forward direction will take place because the direction control flip-flop FRB will be in the reset state as indicated in FIGURE 19 so that an order read forward signal ORF will appear on the output to direct the forward motion of the tape past the reading head.

After the tape motion begins, the tape channel selection circuitry is conditioned to send out signals which will read only those channels containing the words 9 through 16 of the first blockette. This selection will be made by the flip-flop R1 in FIGURE 17 which is set by the signals FA, *sta*2, R4D all gated together on the set input of the flip-flop R1. With R1 active, the preamplifier switch for channels 4, 5, 6, and 7 will be open so that words 9 through 16 of the first blockette will be read. The $\overline{K}$ flip-flop of FIGURE 19 will be switched from its set state by the signals including the FA signal, signal *sta*2 and a signal indicating that the K flip-flop delayed ($\overline{KD}$) is present on the reset gate of the flip-flop. When the K flip-flop switches, the output signal *k* will occur and will be applied to the set input of the flip-flop R4 of FIGURE 17. This latter *k* signal will set the flip-flop R4 so that the output line $\overline{R4}$ is active.

With the start read signal SR present due to the detection of a beginning block mark, the data from the four channels selected, channels 4, 5, 6, and 7 will be read into the respective registers D, C, B and A. The SR signal is applied to the flip-flops SD and SC in FIGURE 16 to activate the gating circuits in the cross-over detection COD. Further, the output from the flip-flop at *s*D is used to control the flip-flops SA and SB to set these flip-flops so that the gates for the inputs to registers A and B will also be opened. The shift pulses for shifting the information in each of the registers A–D is derived from each of the tape reading circuits in the manner illustrated in FIGURE 16. The shift signal is taken from an output of the cross-over detector in each channel and one shift signal will be produced for each bit read from the tape. This is more fully described in the above mentioned application of K. E. Perry. As pointed out above, the shift in each of the channels is an asynchronous shift and as soon as the lead sentinel in each of the channels is received at a predetermined point along the associated register, the shifting is stopped by the STR signal read from the respective registers back to the tape reading circuits of FIGURE 16.

When the tape read signal SR is reecived and is used to set the flip-flop SD, there will be an output pulse *s*D which is used to close the clock gate 60 in FIGURE 15. This will prevent any clock signals from passing therethrough to the shapers connected to the output. In addition, the signal *s*D is applied to set the flip-flop EWA to its starting position, the flip-flop TRFA also has the *s*D pulse applied to switch it back to its reset condition, which under the explanation thus far is of no consequence since the flip-flop has remained in its reset condition as indicated in the drawing. The flip-flop EWB has been reset by the signal *stb*2.

As the words 15 and 16 are being read into the input register A, the lead sentinel which is ahead of the word 15 will be detected first in a "one and only one" circuit having inputs from the A register cores A12 and A11 in FIGURE 9. This will generate a single pulse on the output of the core A293 which has a $2^0$ value.

Two pulse periods later, the lead sentinel will have come down through the one and only one circuit including the cores A269–A274 from the cores A9 and A10 in the A register to the output of the core A274 and will have an assigned value of $2^2$.

The lead sentinel coming out of the core A293 will be applied to the inhibit winding on the core A294 and this will block out one of the ones from the ones generator 1A and consequently there will be no output on the next shift from the core A294. This will mean that there will be no inhibit signal on the core A281 on the following shift. By not energizing the inhibit winding on core A281, it is possible for a pulse to propagate therein from the core A280 when the beginning run relay K19 is closed and if a signal has been written into the core A280. In order to write a signal into the core A280, it is necessary to have a signal from the core A306, the latter coming in from the decimal digit selectors of FIGURE 14. The write-in into the core A280 is also controlled by an inhibit winding thereon, the latter if energized will prevent any write-in into this core from the core A306. It will be noted that the inhibit winding for the core A280 receives its signal from the core A279, the latter having a ones generator connected thereto to normally produce ones on the output as long as there is no inhibit applied to the core A279. The only time that an inhibit signal will be applied to the core A279 will be when there is a signal in the $2^0$ position of the selected digit of the control word. In the absence of this, the ones will come through the core A279 to prevent any writing into the core A280. Consequently, there will be no output from the core A280 and nothing can be written into the core A281 even though the inhibit winding thereon is not active due to the lead sentinel having effectively opened the core for reading. With nothing written into the core A281, this next shift will produce no output.

The checking for the $2^2$ bit of the decimal digit positions 10–12 and decimal digit positions 1–8, depending upon the switches selected, will be made two pulse periods later in the sequence described above. Thus, the $2^2$ bit of the selected decimal digit, DD1–DD8, will be propagated out of the core A296 of FIGURE 14 and will be written into the core A266 of FIGURE 13 providing the $2^2$ bit has been sensed in the particular selected decimal digit DD10–DD12 which is being examined. If a bit is written into the core A266 and this bit corresponds with the shifting of the lead sentinel control function down to the core A267, there will be an output signal from the core A267 and an output from the core A278. However, if the decimal digit signals are not present, there will be no output from the core A278 and there will be no beginning of run signal on the output of the core A278.

In preparation for the checking of the operation of the circuit, the pulses on the output of the core A274 and A293 of FIGURE 13 are coupled into the cores A307 and A298 respectively in FIGURE 14. These latter two cores will have a signal written therein providing there is no inhibit signal applied thereto. In the beginning of run mode of operation, the relay contacts K15–2 and K15–3 will be in the position opposite that shown upon the drawing and there will be no inhibit applied to the cores A298 and A307. With the sense pulses applied to the cores A298 and A307, the next shift will move these sense pulses out into the cores coupled thereto. A signal from the core A307 will be shifted into the core A308 and the signal in the core A298 will be eventually shifted into the core A304. Signals from the cores A304 and A308 are applied to the exclusive OR circuit cores A305, A309, A327 and A328 of FIGURE 15. This exclusive OR circuit is so arranged that if one of the pulses is present and the other is not, thereby indicating a failure of the circuit to perform properly, an output signal will be generated and stored in the cores A329 and A311. The next subsequent shift will move this signal to the inhibit windings on the cores M225 and M228 in FIGURE 14. It will be noted that in the absence of an inhibit signal on the inhibit windings of the cores M225 and M228, the sense pulse from the core A307 will propagate through the cores A320, A321 and A322 into the cores M228 and M225.

The exclusive OR circuit of FIGURE 15 is also coupled to the core A267 and A283 of FIGURE 13. This latter connection is provided for checking to see that both signals from the decimal digit indicators of the control word are present when a beginning of run is detected. In the absence of this check, an output signal will be present from the two exclusive OR circuits and these may be used in any desired manner on the output cores A330 and A313 to indicate that there has been an error.

Assuming that on the first read that the selected control digits of the control word were not selected, it is desired to go on and read the next block on the tape. From the description described above, it will be seen that there will be stored in the cores M225 and M228 in FIGURE 14 a signal, providing there has been no error.

As soon as an end block mark is detected on a tape in the tape read circuits, a signal TRF will be applied to the flip-flop TRFA, FIGURE 19, and this will in turn produce on the output of this flip-flop a pulse *trf*A. This pulse *trf*A will be applied to the gate 65 on the input of the clock gate 60 in FIGURE 15. This will open the clock gate and signals will be applied from the gate 60 to the Y shaper 62, to the ones generator 63, and to the M shaper 64. With the M shaper 64 energized, shift pulses will be applied to the M cores so that any information stored therein will be shifted out. Thus, the cores M225 and M228 will be shifted to produce an output signal BRL which is used to again set the tape motion demand flip-flops EWA and EWB. This conditions the tape control circuitry for a further block reading cycle.

The lead sentinel coming in by way of the core A11 will establish the signal which will be written into the core A304. In addition, the signal passing into core A304 will be written into the core A333, the latter in turn feeding the cores A334, A299, and cores A323, A303, and A301. The cores A323 and A301 produce the signals *bre*1 and *bre*3 used in the counter circuits of FIGURE 17. These signals are effective to keep track of what has been read from the tape and insure that the next read from the tape is at a desired location. The core A303 may have an output signal *bre*2 which is used in the control flip-flop K in FIGURE 19. This is also required to set up the tape control circuits for the next tape read operation.

As it is desired in the assumed stated conditions to read a further block, the information in the input register must be cleared and this is accomplished in the following manner. In FIGURE 14 it is to be noted that when a sense pulse is fed in from the core A274 to the switch SW14–1, the core A307 will be set. When the core A307 is shifted, it will write into the core A315 so that on the next subsequent shift, the signal in the core A315 will be read into the core A314. The core A314 is a flip-flop or ones generator which will produce a series of ones as long as shift pulses are applied to the A cores. These ones will be read out into the core A316 and then to the cores A119 in FIGURE 11 and A179 in FIGURE 9. In the case of both the cores A119 and A179, the read-in will be on an inhibit winding which will have the effect of preventing any information from being read into the cores and further preventing any information from being transferred beyond these cores.

The ones or pulses from the core A316 acting on the core A119 will block the passage of any data through this core to the B register core B52. As pointed out above, the normal processing of data from the input registers is serial and the blocking effected at core A119 will cut off half of the data in the registers as clear shift pulses are applied to the A cores by way of the clock 61. The other half of the data passing from the output of the A register will be blocked by means not shown in the decoder circuitry. For timing reasons, it has been deemed desirable to clear information from the input register at two points, at the output end in the decoding circuit and also at the middle of the register at core A119, the latter being in FIGURE 11. The ones or pulses applied to the core A179 are used to prevent any signals in the registers from passing through the core and establishing a control signal which might be falsely interpreted as a process signal.

Considering the clearing operation more specifically, with the M shaper energized, a series of ones generators are activated for clearing the registers of FIGURES 9, 10, 11 and 12. These ones generators produce a series of ones which, for example, in the case of FIGURE 9 in the A register, supplies ones to the core A117 which in turn supplies ones to the inhibit windings on the cores A53 and A55. In the case of the B register in FIGURE 10, the ones generator producing the clear pulses applies a series of ones to the core B110 which in turn are shifted to the inhibit winding in the core B53. This will prevent any information from passing through the core B53 and will permit the information coming out of core B54 to pass through the core B111, A113, A114 and on out to the A register of FIGURE 9. This same functioning takes place in connection with the core C110 in the C register in the core D111 in the D register.

The clearing operation in the input register will continue until such time as the clock gate 60 is closed to prevent the further supply of signals to the M shaper and the Y shaper on the output of the gate 60. The closing of the gate 60 will be accomplished by the signals *s*D derived from the SD flip-flop of FIGURE 16, the latter being switched into the read state by the signals SR and FA.

In the operation described thus far, words 9 through 16 of a block have been read into the input register, the control word 16 has been checked to see if it contains the desired decimal digits which have been manually selected, and on this first read it has been assumed that the decimal digits were not present. Further, the circuit has functioned to clear the information from the register and condition the register for a further reading operation by the setting of the flip-flops EWA and EWB.

The completion of the clearing of the input registers A–D will take place in the interval between the time that the EWA and EWB signals function to initiate tape movement and the start read signal SR is received on the input of the tape read circuits of FIGURE 16 at the flip-flops SC and SD.

Another input read will take place with the next block on the tape being read in the first blockette in channels 4 through 7 and thereby the reading of the words 9 through 16. Again, the sixteenth control word will be checked to see if it contains the desired control decimal digits.

It is assumed now that the desired decimal digits have been selected. As assumed above the decimal digit switch 10, SW15, and the decimal digit switch 5, SW10, have been manually set to detect if the binary coded decimal five is located in any of the control words scanned in this beginning of run mode. As soon as both the decimal digit 10 and the decimal digit 5 are detected with this code present, the cores M224, M229, and M226 will each have a signal stored therein indicating that the beginning of run code has been detected. In addition, the beginning of run signal will be used to inhibit the sense pulse in the core A320 and also in the core A322 so that no signal will be written into the cores M225, and M228. The read-in operation will continue until all of the input registers are filled and when all the registers are filled, the read-in will stop. The TRF signal indicating the presence of an end block mark will set the flip-flop TRFA and thereby produce on the output the signal *trf*A.

With the signal *trf*A present, the clock gate 60 will be opened to start supplying the signals to the Y shaper 62 and the M shaper 64. When the M shaper 64 is activated, the beginning of run signal on the core M226 is shifted out and then used to again close the gate 60. When the core M226 is shifted, the cores M224 and M229 are also shifted. This will result in the beginning of run signal being applied to the flip-flops FRA and FRB of FIGURE 19. When the flip-flop FRB is set, the output line RB becomes active and will apply signals through the switch K21–3 to the output or read reverse line ORR.

The setting of the flip-flops FRA and FRB will produce the output signals *r*A and *r*B. These two latter signals are used for setting the flip-flops STA and STB in FIGURE 18, the latter operating in the aforedescribed manner to produce the tape order start signal TOSD at the output line *sta*1 and subsequently, after a predetermined time delay, the signal KDA and *sta*2. These signals are used for directing that the tape be moved. Since the output line ORR has been activated, the movement will be in the reverse direction. As soon as the end block mark is detected from this reverse read, the signal $TRR_R$ is produced and is used to reset the flip-flops FRA and FRB in FIGURE 19.

With the signal RB present on the output of the flip-flop FRB, there will be sent through the contacts K22–2, K21–4 and K20–3 a signal for setting up the next tape control operation of read forward. The core M224 will, when shifted, fire a thyratron relay TR220, the latter being used to operate an appropriate signal light and further actuate suitable controls for interrupting the operation of the printer. With the printer stopped, the apparatus will remain stopped until the operator takes appropriate action to put it back into operation again.

*Reading Tape for Normal Processing*

As pointed out above, FIGURE 5 represents the normal type of tape motion and channel read for taking information from all of the channels on the tape. This mode of operation is generally used when the operator has located on the tape the particular group of information that he desires. In this figure, the first words read from blockette 25 will be words 9 through 16. The tape is then reversed and words 1 through 8 of blockette 25 are read. The tape is then again reversed and the words 9 through 16 of blockette 26 are read. This is followed by a tape reversal where the tape is then conditioned for the reading of words 1 through 8 of blockette 26.

In order to achieve this type of operation in the present circuitry, the beginning of run relays BOR are all de-energized and their associated switches are in the position shown upon the drawings. Further, the "process all blocks" switch SW14–1 will likewise be in the position shown upon the drawing. It should be noted that the present apparatus is capable of rejecting selected blockettes if the control word 16 of any particular blockette contains the decimal digits which have been selected for block reject and as selected by the operator with the switches SW6–SW13.

The operator starts the printer and at the 5 degree point in the cycle of the operation of the printer, the tape start signal is received from the printer to set the flip-flops EWA and EWB in FIGURE 18. The setting of these two flip-flops creates the signals *ew*A and *ew*B and these co-operate with the signals FA and FB to set the flip-flops STA and STB. The setting of the flip-flops STA and STB creates the signals *sta*1 (TOSD) and *sta*2.

The signal *sta*2 co-operates with the signals FA and $\overline{KD}$ to set the flip-flop K. The setting of this flip-flop creates the signal *k* which is in turn used for setting the flip-flop R4 to $\overline{R4}$ of the counter circuit of FIGURE 17. With these signals *sta*2, FA, and R4D present on the input gate of the flip-flop R1, this flip-flop will be set so that the output line R1 will be active. This output line is in turn used to activate the particular preamplifier switch for channels 4 through 7 so that these four channels will be read first by the motion of the tape past the reading head. The signals *sta*2 and *stb*1 reset the flip-flop STA in FIGURE 18 to produce the signal KDA. The tape motion will then begin.

As soon as the tape begins motion, the beginning block mark will be detected and the tape control circuit, not shown, will produce the start read signals SR. This signal co-operates with the signal FA on the input of the gating flip-flops SC and SD. This is used to open the read gates and sets up the tape control circuits for use with the next read operation. The signals *s*D from the flip-flop SD is used to set the flip-flops SA and SB. The setting of these latter two flip-flops will open these associated gates so that the read amplifiers associated therewith will pass the information on to the input registers.

The read-in operation in the selected four channels will be in the manner aforedescribed with the lead sentinel in each of the channels being used to terminate the read-in in each of the selected channels.

In order for a block to be accepted, it is necessary that a binary coded decimal 5 be sensed in one of the selected decimal digit locations 1–8 in FIGURE 14. If the block is to be accepted, the writing into the core A298 by the sense pulse from the core A295 will be inhibited. Further, the writing into the core A307 from the core A274 will likewise be inhibited. This will mean that the sentinel pulse which would normally be written into the cores A298 and A307, upon a block reject, will not be present and no signal will be transferred down into the output cores A323, A303, A301, M225 and M228.

As soon as the end block mark signal is detected from the tape and the signal TRF is produced, the flip-flop TRFA will be set. There will then be produced by the signal *trf*A a signal to switch the flip-flops FRA and FRB. The output signals *r*B and *r*A from the flip-flops FRA and FRB are used to set the flip-flops STA and STB. The setting of the flip-flops STA and STB will produce the TOSD signal and subsequently as the flip-flop STA is reset the KDA signal, which is the same as the *sta*2 signal. The tape will be reversed by the signal RB being active and the signal FB being inactive. With FB inactive the inverter in the output line will produce the order reverse signal ORR. When the tape has been reversed, a tape block limit signal $TRR_R$ is received and resets both of the flip-flops FRA and FRB. The *sta*2 signal will in turn be used to co-operate on the input gate to the flip-flop R2 along with the functions FA and R1D to set the flip-flop R2. The signal *stb*2, when combined with the signals FA and KD, will reset the flip-flop K. The circuit is now conditioned for the next tape read and will remain in this state until an end word 9 signal is received at the tape control circuits.

Inasmuch as the block was not rejected, it is desired that the information be processed. The processing of the information will start as soon as a start decode signal is received from the printer which will be at approximately half way through the timing cycle of the printer. When the start decode signal is received, the gate 60 will be opened and the signals from the clock 61 will be allowed to pass through the gate to the Y shaper and thence to the M shaper.

In processing the information, once the clock gate 60 has been activated by a start decode signal from the printer, the movement of the information in the input register will be dependent upon whether or not seven words or eight words are to be processed. In the case of the normal read-in of the words 9 through 16, only the first seven words are normally processed. These words are the words 9 through 15. The word 16 is disregarded as it is most conveniently used as a control word and not as an information carrying word. Considering the operation from the logic standpoint, if seven words are to be processed, the gate 55 in FIGURE 8 will be open and the gates 53 and 54 will be closed. The signals for controlling the seven word mode of operation are derived from the core A178 in FIGURE 13. The core A178 normally receives ones from a ones generator 1A via core A175.

Upon the application of shift signals to the cores in the input register, the information in the register will then begin to move serially out through the gate 55 to the output line 56 and thence to a suitable decoding circuit in the manner described above in conjunction with FIGURE 8.

After the seven words 9 through 15 have been processed, and following the word 9, a manually programmed signal EW9 is derived from circuitry, not shown, after the word 9 has been transferred and is applied to the cores M225 and M228. This EW9 signal will be shifted out of the cores M225 and M228 to set the flip-flops EWA and EWB.

With the EW9 signal being used to set the flip-flops EWA and EWB, the apparatus will then be conditioned to initiate a further tape read by the setting and resetting of the flip-flops STA and STB.

On the next tape read, the channels 0–3 will be read to thereby process the words 1 through 8. In this instance, the eight words read into the input registers A–D will all be read out. The read-out of eight words will be accomplished by the gate 55 being closed and the gates 53 and 54 both being opened by the process eight word signal.

The eight word processing mode is achieved by the circuitry of FIGURE 13. Here, after the EW9 signal is produced, the core A172 will be set. This core feeds a flip-flop core A173, the latter producing a series of ones which pass via the cores A174, A176, and A177 to the core A152 in FIGURE 9. The flip-flop core A173 will be reset by the lead sentinel coming in from core A6 and core A171, the latter being connected to the inhibit winding of core A173. This will not occur until the next read-in for the reason that core A168 is functioning as a flip-flop and applying inhibit signals to core A171 via core A170.

As the second half of the blockette is read into the input register channels A–D, the circuitry must be so arranged that it will not sense information coming into the register A in the manner in which the information was sensed in the control word 16. This is accomplished in the manner illustrated in FIGURE 13 wherein the end word 9 signal EW9 from the previous processing operation will set the core A168. As this core is shifted, it will act as a ones generator and produce a series of ones which are fed into the cores A169 and A170. These signals are in turn fed to the cores A292 and A273 respectively so that signals are applied to the inhibit windings on each of the cores A293 and A274. This will prevent the passing of any lead sentinel or control word sense signal and the information will be read into the register without producing any control function which might otherwise stop the machine.

The core A168 when functioning as a ones generator is arranged to be reset at the end of the processing which is produced by a manually programmed signal EW1 indicating that the end word 1 has been processed. This signal is read into the core A167 which in turn when shifted applies an inhibit signal to the core A168.

Following the second tape read whereby the words 1 through 8 are read, the tape will again be reversed when the signal *trf*A is applied to the input gate of the flip-flops FRA and FRB. In other words, when the flip-flop FRB is set, the output line RB will have a signal thereon and the output line FB will not have a signal thereon. Thus, because of the inverter in the line FB the output signal ORR will be present directing reverse movement of the tape. The signal *r*A and the signal $\overline{R4}$ will be used to set the flip-flop STA to produce the tape order start signal TOSD or *sta*1. In addition, the signal *r*B and $\overline{R4}$ will be used to set the flip-flop STB, the latter producing on the output thereof the signal *stb*1. The signals *stb*1 and STA2D combine, after a time delay, and reset the flip-flop STA to produce the output signal *sta*2 and KDA, the latter initiating movement of the tape in the revere direction. When the signals *sta*2 is produced, it is used to reset the flip-flop STB. The tape will reverse and as soon as the end block mark associated with the reverse movement is detected, as indicated by the signal $TRR_R$, the flip-flops FRA and FRB are both reset to set the apparatus up for the next read forward. In this instance, the apparatus will wait before completing the next tape read until a tape start signal is received from the printer.

When the signals *sta*2, FA, and $\overline{KD}$ appear on the set gate of the K flip-flop, this flip-flop will reverse to the set state and produce the output signals *k*. This signal *k* will be used to reset the counter flip-flop R2. In addition, when the signal *sta*2, R2D, and FB are applied to the set gate of the counter stage R3, this flip-flop counter stage R3 will be set and condition the circuit for the next forward read of the tape in which words 9 through 16 will be read from the second blockette. In other words, the channels 12, 13, 14 and 15 of the tape will now be read with the signal line R3 supplying an active signal to the preamplifier switch associated with the preamplifiers for these channels.

The reading of the second blockette on the tape will correspond to the reading and other control operations associated with reading the first blockette. The word 16 will be scanned for selected control digits to see whether or not the particular blockette is to be processed. In addition, if there is no block reject signal, the circuitry will process seven words on the first processing cycle and then eight words on the second processing cycle.

At the end of the operation of the reading of the words 1 through 8 of the second blockette, or channels 8 through 11, the tape control signals will no longer reverse the tape in the manner which has taken place with respect to the reading of each of the previous sets of channels. The reason for this will be readily apparent when it is considered that now this particular block of information has been read and it is necessary to go on to the next block wherein words 9 through 16 of the first blockette will be read. FIGURE 5 illustrates the relative tape movement and accompanying reading of the tape.

The reason for not reversing the tape is to be found in the review of the tape directional control flip-flops FRA and FRB. It will be noted that these flip-flops can be set for a reverse movement only when the signal $\overline{R4}$ is present. As the R4 flip-flop is in the set state after the reading of the channels 8 through 11, of the preceding block, the set gate for these direction control flip-flops FRA and FRB are reset. Then the flip-flops FRA and FRB will be conditioned so that the next tape movement will be in the forward direction as soon as a start tape signal is received from the printer.

In the checking of any particular control word 16 in each of the blockettes wherein the acceptance code is not found, it is desired that a block reject take place so that none of the information in that particular blockette be transferred out of the input register. In this case, referring to FIGURE 14, the lead sentinel will be written into the cores A298 and A307 from the cores A295 and A274 of FIGURE 13. The signal in the core A298 will be transferred down through the cores A302, A333, A334, A229, into the cores A301, A303, and A323. The signals will then be transferred out to the circuits indicated. Thus, the core A301 will be read out to supply a signal to the flip-flop R4 in the counter circuit of FIGURE 7. If R3 was previously active, the signals *bre*3 will switch the flip-flop R4 to the reset state. If the flip-flop R3 was not active, then nothing will be done to do any switching on the flip-flop R4.

When the core A323 has a signal read therefrom, this will supply a signal *bre*1 to the flip-flop R2. With the flip-flop R1 producing an output signal R1D and with FA present, the flip-flop R2 will be set to condition the circuitry so that when the next signal *sta*2 is received at the counter circuit, it will be effective to set up the flip-flop R3. In other words, this block reject signal is used to condition the counter so that words 1 through 8 will not be read into the input register if a particular block is to be rejected.

When the core A303 is shifted, it will supply a signal *bre*2 to reset the flip-flop K of FIGURE 19. The output signal $\overline{k}$ will be effective to reset the flip-flops R1 or R3 of FIGURE 17.

The net result of the block reject in a series of blocks will be as illustrated in FIGURE 6 wherein words 9 through 16 are examined in each of the blockettes and the words 1 through 8 are not examined at all in the absence of an acceptance signal in the control word 16. In comparing this with the functioning of FIGURE 5, it will be apparent that only half as many passes are made over the information in the block in order to derive the necessary control information. It will be apparent that, for example, the blockette 25 could be processed and the blockette 26 rejected inasmuch as the control word 16 in each of the blockettes is examined for an acceptance signal. In preparing a tape for this apparatus, the programmer may so arrange his information on the tape so that he can select various combinations without affecting the operation.

If it is desired to process all of the blocks on the tape, the switches SW14–1 and SW14–2 in FIGURE 14 are moved to the position opposite that shown on the drawing. This will prevent the writing in of the lead sentinel or control word sense pulse into either of the cores A298 and A307, said pulses normally generating a block reject in the event that an acceptance code is not found. Under these circumstances, the tape reading operation will take place as above described. That is, the blockettes will be read in all channels and the words 1 through 15 or 1 through 16 in each of the blockettes will be processed.

As discussed above, when all blocks are to be processed, in order to process the control word 16, it is necessary to switch the switch SW5–1 in FIGURE 13 to its upper position so that the lead sentinel coming in from the core A6 of the A register may be read into the core A172. When the core A172 is shifted, it will set the flip-flop formed by the core A173 and consequently there will be a series of ones read into the core A174. These ones will be effective to inhibit the write-in of ones to the core A175 and will further provide a series of ones through the core A176 to the core A177. It will be noted that the effect of this will be to activate the eight word processing mode signal line so that the information in the A register will be moved out, with the control word 16 passing out through the cores A149, A151, and A153 to the output line leading to the decoding circuitry.

After the eight word processing mode is initiated by the lead sentinel from the core A6, the eight word processing will continue inasmuch as the end word 9 signal coming in to the core A172 will have the effect of maintaining the core A173 in its active state as a flip-flop with the processing of the next words of the blockette, words 1 through 8.

As pointed out above, when the switch SW5–1 is returned to its position as shown in the drawing, the lead sentinel coming in from the core A6 will be effective to inhibit the core A173 so that the seven word mode of operation will take place for the words 9 through 16 of the next blockette.

Under certain circumstances, it is desirable that the apparatus continuously sense to determine whether or not the end of a particular run has been reached. By definition in the described apparatus, the end of run code will be detected by the presence in the decimal digit 9 location of the control word of a binary coded decimal 5. To effect a sensing of this particular control word position, the switch SW4 of FIGURE 13 will be manually set to the active position. This will result in a signal passing through the switch SW4 and switch K19-5 to cores A267, A277 and A281. Whether or not a signal will be written into the cores A267, and A281 will be dependent upon whether or not the lead sentinel control signal is inhibiting either of these cores. The writing into the core A278 from A277 will likewise be controlled by the presence or absence of the lead sentinel control signal on the inhibit winding A278. If the core A281 is set by the end of run code, a signal will be shifted out of this core to provide an indication of the end of run by way of the core A285, M224, and the thyratron relay 220.

While, in accordance with the provisions of the statutes, there has been illustrated and described the best forms of the invention known, it will be apparent to those skilled in that art that changes may be made in the forms of the apparatus as disclosed without departing from the spirit of the invention as set forth in the appended claims, and that in some cases certain features of the invention may be used to advantage without a corresponding use of other features.

Having now described the invention, what is claimed as new and for which it is desired to secure by Letters Patent is:

1. Apparatus for manipulating digital data comprising a plurality of multi-bit serial storage registers, each having an input and an output, a separate signal source connected to each of said inputs and adapted to simultaneously and serially transfer digital data into an input on each of said registers, a single register output circuit, gating means connecting the outputs of all of said registers so that information may be shifted serially therefrom through said single register output circuit, a separate shifting signal source connected to each of said plurality of storage registers, said separate shifting sources being active on the transfer of data into said registers from the respective separate signal sources, and a further shifting signal source independent of said separate shifting sources connected to all of said registers to serially shift the data from said registers.

2. A digital data manipulating circuit comprising a plurality of serial shift registers each having a pair of inputs and a pair of outputs, a plurality of digital signal sources, means connecting said sources so that one source is connected to one of the inputs of said registers so that all of said registers may have data transferred thereto simultaneously, means connecting an output of each register to said one input of the same register, and means connecting the other output of each register to the other input of an adjacent register so that the data in all of said registers may be shifted serially to a single output circuit.

3. A digital data manipulating circuit comprising a plurality of serial shift registers each having a pair of inputs and a pair of outputs, a plurality of digital signal sources, means connecting said sources so that one source is connected to one of the inputs of said registers so that all of said registers may have data transferred thereto simultaneously, means connecting an output of each register to said one input of the same register, means connecting the other output of each register to the other input of an adjacent register so that the data in all of said registers may be shifted serially to a single output circuit, a plurality of shift signal sources connected to be actuated by the signals from said plurality of digital signal sources, means connecting said shift signal sources one each to each of said plurality of registers, and a further shift signal source connected to all of said registers, said latter shift signal source being activated to serially shift all of the data in said registers to said single output circuit.

4. A digital data manipulating circuit comprising a plurality of serial shift registers each having a pair of inputs and a pair of outputs, a plurality of digital signal sources, means connecting said sources so that one source is connected to one of the inputs of said registers so that all of said registers may have data transferred thereto simultaneously, means connecting an output of each register to said one input of the same register, means connecting the other output of each register to the other input of an adjacent register so that the data in all of said registers may be shifted serially to a single output circuit, and gating means connected to said single output circuit to selectively pass the digital data in said registers through said single output circuit.

5. Apparatus for use with a data tape having data serially stored thereon in a plurality of channels in the form of record blocks and means for reading the information on the blocks to a utilization circuit comprising a multiple channel data input having a plurality of signal outputs each of which is related to one of said plurality of channels, a plurality of serial shift registers adapted to receive simultaneously the data transferred by way of said signal outputs from preselected channels on the data tape, gating means connected to said shift registers, a pair of separate shift signal sources, one of which is adapted to shift said registers in synchronism with the data received from said data tape by way of said data input, the other of which is adapted to shift all of said registers simultaneously, and circuit means including said gating means selectively transferring or blocking the flow of data between registers.

6. Apparatus for use with a data tape having data serially stored thereon in a plurality of channels in the form of record blocks and means for reading the information on the blocks to a utilization circuit comprising a multiple channel input having a plurality of signal outputs each of which is related to one of said plurality of channels, a plurality of serial shift registers adapted to receive simultaneously the data transferred by way of said signal outputs from preselected channels on the data tape, gating means connected to said shift registers, a pair of separate shift signal sources, one of which is connected to shift said registers in synchronism with the data received from said data tape, the other of which is connected to shift all of said registers simultaneously, circuit means including said gating means selectively transferring or blocking the flow of data between registers, and means activating said gating means only while said other shift signal source is active.

7. Apparatus for use with a data tape having data serially stored thereon in a plurality of channels in the form of record blocks and means for reading the information on the blocks to a utilization circuit comprising a multiple channel input having a plurality of signal outputs each of which is related to one of said plurality of channels, a plurality of serial shift registers adapted to receive simultaneously the data transferred by way of said signal outputs from preselected channels on the data tape, gating means connected to said shift registers, a pair of separate shift signal sources, one of which is connected to shift said registers in synchronism with the data received from said data tape, the other of which is connected to shift all of said registers simultaneously, and circuit means including said gating means selectively transferring or blocking the flow of data between registers, said circuit means comprising means connected to one of said registers to derive control data therefrom to selectively control said circuit means.

8. Apparatus for use with a data tape having data serially stored thereon in a plurality of channels in the form of record blocks and means for reading the information on the blocks to a utilization circuit comprising a plurality of multi-bit serial shift registers each of which is adapted to receive simultaneously data transferred from preselected channels on the data tape, circuit means connected to one of said registers to sense control data stored therein as derived from a channel of a record block, and tape control means connected to said circuit means and controlled thereby to effect the transfer of new information into said registers from the tape.

9. Apparatus for use with a data tape having data serially stored thereon in a plurality of channels in the form of record blocks and means for reading the information on the blocks to a utilization circuit comprising a plurality of multi-bit serial shift registers each of which is adapted to receive simultaneously data transferred from preselected channels on the data tape, circuit means connected to one of said registers to sense control data stored therein as derived from a record block, tape control means connected to said circuit means to effect the transfer of new information into said registers from the tape, and means including said circuit means rejecting data in said registers prior to an output transfer upon the detecting of selected control data in said one register.

10. Apparatus for use with a data tape having data serially stored thereon in a plurality of channels in the form of record blocks and means for reading the information on the blocks to a utilization circuit comprising a plurality of multi-bit serial shift registers each of which is adapted to receive simultaneously data transferred from preselected channels on the data tape, circuit means connected to one of said registers to sense control data stored therein as derived from a record block, tape control means connected to said circuit means to effect the transfer of new information into all of said registers from the tape, and means including said circuit means connected to stop said tape control means when positioned to transfer new information to said registers upon the detection of preselected control data in said one register.

11. Apparatus for use with a data tape having data serially stored thereon in a plurality of channels in the form of record blocks and means for reading the information on the blocks to a utilization circuit comprising a plurality of multi-bit serial shift registers each of which is adapted to receive simultaneously the data transferred from preselected channels on the data tape, circuit means connected to one of said registers to sense control data stored therein as derived from a record block, said circuit means producing signals for selectively stopping said apparatus upon the sensing of first control data, rejecting the information in said registers upon the sensing of second control data, and directing the movement of the tape for a further input transfer, and tape control means connected to said circuit means to be controlled thereby.

12. Apparatus for manipulating digital data formed by a series of bits grouped into a word and wherein a lead bit is positioned at one end of the data comprising a data storage and transfer register, first circuit means coupled to said register to sense said lead bit, said first circuit means comprising means to generate from the sensing of said lead bit a characterized control signal, second circuit means connected to said register to sense selected bits in said register, and comparison means connected to said first and second circuit means to produce a control indication of agreement between said characterized control signal and said selected bits.

13. Apparatus for manipulating digital data formed by a series of bits grouped into a word and wherein a lead bit is positioned at one end of the data comprising a data storage and transfer register, first circuit means coupled to said register to sense said lead bit, said first circuit means comprising means to generate from the sensing of said lead bit a characterized control signal, second circuit means including a plurality of manually set switches connected to said register to sense selected bits in said register, and comparison means connected to said first and second circuit means to produce a control indication of agreement or lack of agreement between said characterized control signal and said selected bits.

14. Apparatus for manipulating digital data formed by a series of bits grouped into a word and wherein a lead bit is positioned at one end of the data comprising a data storage and transfer register, first circuit means coupled to said register to sense said lead bit, said first circuit means comprising means to generate from the sensing of said lead bit a characterized control signal, second circuit means connected to said register to sense selected bits in said register, comparison means connected to said first and second circuit means to produce a control indication of agreement between said characterized control signal and said selected bits, and register control means connected to said comparison means and said register to control the manipulation of the data in said register in accordance with the control indication from said comparison means.

References Cited in the file of this patent

UNITED STATES PATENTS

| | | |
|---|---|---|
| 2,769,925 | Saunders | Nov. 6, 1956 |
| 2,784,390 | Li Chien | Mar. 5, 1957 |
| 2,798,216 | Goldberg | July 2, 1957 |
| 2,801,334 | Clapper | July 30, 1957 |
| 2,808,986 | Stone | Oct. 8, 1957 |
| 2,856,595 | Selmer | Oct. 14, 1958 |
| 2,901,732 | Canning | Aug. 25, 1959 |
| 2,911,622 | Ayres | Nov. 3, 1959 |
| 2,913,705 | Cox | Nov. 17, 1959 |

FOREIGN PATENTS

| | | |
|---|---|---|
| 749,836 | Great Britain | June 6, 1956 |

OTHER REFERENCES

IBM Customer Engineering Manual of Instruction 650 Data Processing System, copyright 1956.